(12) United States Patent
Kim et al.

(10) Patent No.: US 12,267,575 B2
(45) Date of Patent: Apr. 1, 2025

(54) DRIVING DEVICE, CAMERA MODULE, AND PORTABLE TERMINAL DEVICE

(71) Applicant: LG INNOTEK CO., LTD., Seoul (KR)

(72) Inventors: Kyung Won Kim, Seoul (KR); Chan Joong Kim, Seoul (KR); Hyun Gyu Roh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 393 days.

(21) Appl. No.: 17/628,632

(22) PCT Filed: Jul. 28, 2020

(86) PCT No.: PCT/KR2020/009958
§ 371 (c)(1),
(2) Date: Jan. 20, 2022

(87) PCT Pub. No.: WO2021/020868
PCT Pub. Date: Feb. 4, 2021

(65) Prior Publication Data
US 2022/0368818 A1    Nov. 17, 2022

(30) Foreign Application Priority Data

Jul. 31, 2019   (KR) .................... 10-2019-0092859
Oct. 15, 2019   (KR) .................... 10-2019-0128085

(51) Int. Cl.
*H04N 23/57*   (2023.01)
*G02B 7/10*    (2021.01)
(Continued)

(52) U.S. Cl.
CPC .............. *H04N 23/57* (2023.01); *G02B 7/10* (2013.01); *G03B 5/00* (2013.01); *G03B 30/00* (2021.01);
(Continued)

(58) Field of Classification Search
CPC .................... G03B 2205/0023; G03B 17/17
See application file for complete search history.

(56) References Cited

U.S. PATENT DOCUMENTS

2015/0153584 A1*  6/2015  Yasuda ............... G02B 27/646
                                                    359/557
2016/0241787 A1   8/2016  Sekimoto
(Continued)

FOREIGN PATENT DOCUMENTS

CN     107850751     3/2018
CN     107918183     4/2018
(Continued)

OTHER PUBLICATIONS

International Search Report dated Oct. 21, 2020 issued in Application No. PCT/KR2020/009958.
(Continued)

*Primary Examiner* — Noam Reisner
(74) *Attorney, Agent, or Firm* — KED & Associates LLP

(57) ABSTRACT

An embodiment of the present invention relates to a driving device comprising: a second guide part; a first guide part disposed in the second guide part; an optical unit disposed in the first guide part; a first driving part disposed in the optical unit; and a second driving part disposed opposite to the first driving part, wherein the first guide part comprises: a first fixing part coupled to the second guide part; a first moving part connected to the optical unit; and a first connection part for connecting the first fixing part to the first moving part, and the optical unit is tilted about the first connection part by the first moving part.

18 Claims, 16 Drawing Sheets

(51) Int. Cl.
  *G03B 5/00* (2021.01)
  *G03B 30/00* (2021.01)
  *H04N 23/54* (2023.01)
  *H04N 23/68* (2023.01)

(52) U.S. Cl.
  CPC ............ *H04N 23/54* (2023.01); *H04N 23/687* (2023.01); *G03B 2205/003* (2013.01)

(56) References Cited

U.S. PATENT DOCUMENTS

| | | |
|---|---|---|
| 2017/0146767 A1 | 5/2017 | Sekimoto et al. |
| 2018/0109660 A1 | 4/2018 | Yoon et al. |
| 2018/0120532 A1 | 5/2018 | Murakami et al. |
| 2018/0348538 A1 | 12/2018 | Sugawara |
| 2019/0212632 A1 | 7/2019 | Miller et al. |
| 2019/0227337 A1 | 7/2019 | Kuo et al. |
| 2019/0230255 A1* | 7/2019 | Fu .................... G02B 7/182 |

FOREIGN PATENT DOCUMENTS

| | | |
|---|---|---|
| CN | 107942605 | 4/2018 |
| JP | 2013041026 | 2/2013 |
| JP | 2015-194660 A | 11/2015 |
| KR | 10-2016-0121298 | 10/2016 |
| KR | 10-2019-0015788 | 2/2019 |
| WO | WO 2017/122993 | 7/2017 |

OTHER PUBLICATIONS

European Search Report dated Jul. 28, 2023 issued in Application No. 20846113.7.
Korean Office Action dated Apr. 16, 2024 issued in Application 10-2019-0128085.
Chinese Office Action dated Jan. 2, 2024 issued in Application No. 202080055292.2.
Japanese Office Action dated Jul. 30, 2024 issued in Application No. 2022-504640.

* cited by examiner

DRIVING DEVICE, CAMERA MODULE, AND PORTABLE TERMINAL DEVICE

CROSS-REFERENCE TO RELATED PATENT APPLICATIONS

This application is a U.S. National Stage Application under 35 U.S.C. § 371 of PCT Application No. PCT/KR2020/009958, filed Jul. 28, 2020, which claims priority to Korean Patent Application Nos. 10-2019-0092859, filed Jul. 31, 2019 and 10-2019-0128085, filed Oct. 15, 2019, whose entire disclosures are hereby incorporated by reference.

TECHNICAL FIELD

The present embodiment relates to a driving device, a camera module, and a portable terminal device.

BACKGROUND ART

The camera module photographs a subject and stores it as an image or video, and is mounted on mobile terminals such as cell phones, laptops, drones, and vehicles.

Meanwhile, portable devices such as smartphones, tablet PCs, and laptops have built-in micro camera modules, and these camera modules may perform an autofocus (AF) function that aligns the focal length of the lens by automatically adjusting the distance between the image sensor and the lens.

A recent camera module can perform a zooming function of zooming up or zooming out by increasing or decreasing the magnification of a distant subject through a zoom lens.

In addition, recent camera modules employ image stabilization (IS) technology to correct or prevent image shaking due to camera movement caused by an unstable fixing device or a user's movement.

Such image stabilization (IS) technology comprises an optical image stabilizer (OIS) technology, an image stabilization technology using an image sensor, and the like.

OIS technology is a technology that corrects motion by changing the path of light, and image stabilization technology using an image sensor is a technology that corrects movement by mechanical and electronic methods, but OIS technology is being adopted more and more.

Meanwhile, a zoom actuator is used for the zooming function in the camera module, and friction torque is generated when a lens is moved due to the mechanical movement of the actuator, and such a frictional torque causes technical problems such as a decrease in driving force, an increase in power consumption, or a degradation in control characteristics.

In particular, in order to obtain the best optical characteristics by using a plurality of zoom lens groups in the camera module, the alignment between the plurality of lens groups and the alignment between the plurality of lens groups and the image sensor must be well matched, but when decentering, which is a phenomenon in which the center of a spherical surface between lens groups deviates from the optical axis, or tilting, which is a phenomenon of lens inclination, or a phenomenon in which the central axis of the lens group and the image sensor are not aligned occurs, the angle of view is changed or out of focus occurs and it will adversely affect picture quality or resolution.

Meanwhile, when increasing the separation distance in the area where friction occurs to reduce friction torque resistance when moving the lens for zooming function in the camera module, a technical inconsistency problem is occurring, in which lens decentering or lens tilting is deepened during zoom movement or zoom reversing.

Meanwhile, as the image sensor goes to a higher pixel, the resolution increases and the size of the pixel becomes smaller, and as the pixel becomes smaller, the amount of light received at the same time decreases. Therefore, as the resolution of a camera becomes higher, the image shaking due to hand shake that occurs when the shutter speed is slowed in a dark environment becomes more severe.

Accordingly, the OIS function has recently been essentially adopted in order to photograph an image without distortion using a high-resolution camera in a dark night or moving picture.

Meanwhile, OIS technology is a method of correcting image quality by moving the camera's lens or image sensor to correct the optical path, and in particular, OIS technology detects camera movement through a gyro sensor, and based on this, the distance the lens or image sensor needs to move is calculated.

For example, as for the OIS correction method, there are a lens movement method and a module tilting method. In the lens movement method, only the lens in the camera module is moved to realign the center of the image sensor and the optical axis. On the other hand, the module tilting method is a method of moving the entire module comprising the lens and image sensor.

Especially, the module tilting method has a wider correction range than the lens movement method, and since the focal length between the lens and the image sensor is fixed, there is an advantage in that image deformation can be minimized.

Meanwhile, in the case of the lens movement method, a position recognition sensor, for example, a Hall sensor is used to detect the position and movement of the lens. On the other hand, in the module tilting method, a photo reflector is used to detect the movement of the module. However, both methods use a gyro sensor to sense the movement of the camera user.

The OIS controller uses the data recognized by the gyro sensor to predict where the lens or module should move to compensate for the user's movement.

According to the recent technology trend, ultra-slim and ultra-small camera modules are required, but there is a space limitation for OIS operation in the ultra-small camera module, which makes it difficult to implement the OIS function applied to general large cameras, and there is a problem in that it is not possible to implement an ultra-small camera module when OIS driving is applied.

In addition, in the conventional OIS technology, within the limited size of the camera module, as the OIS driver is disposed on the side surface of the solid lens assembly, the size of the lens that is the object of the OIS is limited, making it difficult to secure the amount of light.

In particular, in order to obtain the best optical characteristics by using a plurality of zoom lens groups in the camera module, the alignment between the plurality of lens groups and the alignment between the plurality of lens groups and the image sensor must be well matched, but in the conventional OIS technology, there is a problem that when decentering, which is a phenomenon in which the center of a spherical surface between lens groups deviates from the optical axis, or tilting, which is a phenomenon of lens inclination occurs, the angle of view is changed or defocus occurs, thereby adversely affecting image quality or resolution.

In addition, in the conventional OIS technology, AF or zooming can be implemented at the same time as OIS driving, but due to the space constraints of the camera module and the position of the driving part of the existing OIS technology, the magnet for OIS and the magnet for AF or zooming are placed close to each other, thereby causing magnetic interference, and thus, there is a problem in that the OIS driving does not operate properly, thereby causing decentering or tilting phenomenon.

In addition, since the conventional OIS technology requires a mechanical driving device for lens movement or module tilting, there is a problem in that the structure is complicated and power consumption is increased.

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Recently, camera modules being mounted on portable terminals employ image stabilization (IS) technology to correct or prevent image shaking due to camera movement caused by unstable fixing devices or user movement. Such image stabilization (IS) technology comprises an optical image stabilizer (OIS) technology, an image stabilization prevention technology using an image sensor, and the like.

OIS technology is a technology that corrects motion by changing the path of light, and image shake prevention technology using an image sensor is a technology that compensates movement by mechanical and electronic methods, but OIS technology is being adopted more and more.

Meanwhile, as for a method of OIS correction, there is a lens movement method in which only the lens in the camera module is moved to realign the center and optical axis of the image sensor, and a module tilting method in which both the lens and the image sensor are moved.

In the case of the lens movement method, there is a problem in that the corrected image is different from the original as the angle of inclination of the camera increases.

In addition, an ultra-slim and ultra-small camera module is required according to the recent technology trend, but in an ultra-small camera module, there is a problem of space limitation for OIS driving in a module tilting method.

DETAILED DESCRIPTION OF THE INVENTION

[Technical Subject]

A subject to be solved by the first embodiment of the present invention is to provide a driving device, a camera module, and a portable terminal device capable of preventing friction torque generated when each lens group is moved through zooming in a camera module.

In addition, a subject to be solved by the first embodiment of the present invention is to provide a driving device, a camera module, and a portable terminal device capable of preventing the occurrence of a phenomenon in which lens decentering or lens tilting, and the like, in which the center of the lens and the center axis of the image sensor do not coincide, when each lens group is being moved through zooming in a camera module.

In addition, a subject to be solved by the first embodiment of the present invention is to provide an ultra-slim and ultra-compact driving device, a camera module, and a portable terminal device.

In addition, a subject to be solved by the first embodiment of the present invention is to provide a driving device, a camera module, and a portable terminal device capable of securing sufficient amount of light by eliminating the size limitation of the lens in the lens assembly of the optical system when implementing OIS.

In addition, a subject to be solved by the first embodiment of the present invention is to provide a driving device, a camera module, and a portable terminal device capable of achieving the best optical characteristics by minimizing the occurrence of decentering or tilting when implementing OIS.

In addition, a subject to be solved by the first embodiment of the present invention is to provide a driving device, a camera module, and a portable terminal device capable of preventing magnetic field interference with magnets for AF or zooming when implementing OIS.

In addition, a subject to be solved by the first embodiment of the present invention is to provide a driving device, a camera module, and a portable terminal device capable of implementing OIS with low power consumption.

A subject to be solved by the second embodiment of the present invention is to provide a camera module of a module tilting method for tilting the entire module through a hinge structure.

In addition, a subject to be solved by the second embodiment of the present invention is to provide a camera module in which a tilting angle is maximized while minimizing an increase in volume through a hinge structure.

In addition, it is to provide a camera module capable of 2-axis tilt with one hinge.

Technical Solution

A driving device according to a first embodiment of the present invention for achieving the above subject comprises: a second guide part; a first guide part disposed in the second guide part; an optical unit disposed in the first guide part; a first driving part disposed in the optical unit; and a second driving part disposed opposite to the first driving part, wherein the first guide part comprises a first fixing part coupled to the second guide part, a first moving part connected to the optical unit, and a first connection part for connecting the first fixing part to the first moving part, and wherein the optical unit is tilted by the first moving part with the first connection part as an axis.

In addition, the first fixing part and the first moving part are disposed vertically, and a predetermined gap may be formed between the first fixing part and the first moving part.

In addition, it comprises: third and fourth driving parts disposed in the second guide part; and a lens unit coupled to the second guide part, wherein the second guide part may comprise a second moving part to which the first fixing part is coupled, a second fixing part coupled to the lens unit, and a second connection part to connect the second moving part and the second fixing part.

In addition, the optical unit may be tilted by the second moving part with the second connection part as an axis.

In addition, the second fixing part and the second moving part are disposed vertically, and a predetermined gap may be formed between the second fixing part and the second moving part.

In addition, the first fixing part comprises three surfaces, the first moving part comprises three surfaces, and the first connection part may connect two of the three surfaces of the first fixing part and two of the three surfaces of the first moving part, respectively.

In addition, the second fixing part comprises three surfaces, the second moving part comprises three surfaces, and the second connection part may connect one of the three surfaces of the second fixing part and one of the three surfaces of the second moving part.

In addition, the three surfaces of the second fixing part face each of the three surfaces of the first moving part, and the three surfaces of the second moving part face each of the three surfaces of the first fixing part; the first connection part connects two surfaces facing each other among the three surfaces of the first fixing part and two surfaces facing each other among the three surfaces of the first moving part; and the second connection part may connect a surface that does not face each other among the three surfaces of the second fixing part and a surface that does not face each other among the three surfaces of the second moving part.

In addition, the third driving part is disposed on at least one of the three surfaces of the second moving part, the fourth driving part is disposed on at least one of the three surfaces of the second fixing part, and a surface on which the third driving part is disposed and a surface on which the fourth driving part is disposed may be positioned to correspond to each other.

In addition, a lens coupling part to which the lens unit is coupled may be disposed on two surfaces facing each other among the three surfaces of the second fixing part.

In addition, a third guide part disposed between the first guide part and the second guide part is comprised, and the first fixing part may be coupled to the second guide part by the third guide part.

In addition, the second moving part may be coupled to the first guide part by the third guide part.

In addition, it comprises a substrate on which the second driving part and the third driving part are disposed, and the substrate may comprise a first area in which a part of a second driving part is disposed, a second area in which a third driving part is disposed, and a connection part connecting the first area and the second area.

In addition, the first region of the substrate surfaces the optical unit, and the second region of the substrate may be coupled to the second moving part of the second guide part.

In addition, the optical unit comprises a prism mover and a prism disposed on the prism mover, and the prism mover may comprise a groove accommodating at least a portion of the first driving part.

In addition, the groove may comprise a first groove in which at least a portion of the second driving part is disposed and a second groove in which at least a portion of the first driving part is disposed.

In addition, the second groove is formed in the first groove, and sizes of the first groove and the second groove may be different from each other.

A driving device according to a first embodiment of the present invention for achieving the above subject comprises: a second guide part; a first guide part disposed in the second guide part; and an optical unit disposed in the first guide part, wherein the second guide part comprises a fixing part and a moving part coupled to the first guide part and connected to the fixing part, and wherein the optical unit is tilted with respect to a first axis by the first guide part, and is tilted with respect to a second axis different from the first axis by the moving part.

In addition, the first axis and the second axis may be perpendicular to each other.

In addition, the optical unit comprises a prism mover and a prism disposed on the prism mover, wherein the second axis is a first optical axis incident to the prism or a second optical axis emitted from the prism, and wherein the first axis may be perpendicular to the first optical axis and the second optical axis.

A camera module according to a first embodiment of the present invention for achieving the above subject comprises: a second guide part; a first guide part disposed in the second guide part; an optical unit disposed in the first guide part; a first driving part disposed in the optical unit; a second driving part facing the first driving part; and a lens unit coupled to the second guide part, wherein the first guide part comprises: a first fixing part coupled to the second guide part; a first moving part connected to the optical unit; and a first connection part connecting the first fixing part and the first moving part, and wherein the optical unit is tilted by the first moving part with the first connection part as an axis.

A portable terminal device according to a first embodiment of the present invention for achieving the above subject comprises: a main body; and a camera module disposed in the main body, wherein the camera module comprises: a second guide part; a first guide part disposed in the second guide part; an optical unit disposed in the first guide part; a first driving part disposed in the optical unit; a second driving part facing the first driving part; and a lens unit coupled to the second guide part, wherein the first guide part comprises: a first fixing part coupled to the second guide part; a first moving part connected to the optical unit; and a first connection part connecting the first fixing part and the first moving part, and wherein the optical unit is tilted by the first moving part with the first connection part as an axis.

A camera module according to the second embodiment of the present invention comprises: a hinge in which the fixing part, the first tilt part connected through the fixing part and the first hinge part, and the second tilt part connected through the first tilt part and the second hinge part are integrally formed; a holder disposed on the second tilt part of the hinge; a lens driving device disposed in the holder; a first driving part disposed in the fixing part of the hinge; and a second driving part disposed in the holder, wherein the first tilt part and the second tilt part is tilted in a first axis with respect to the first hinge part, and the second tilt part may be tilted in a second axis with respect to the second hinge part.

The fixing part and the first tilt part may be spaced apart from each other by a predetermined space around the first hinge part, and the spaced being spaced apart may be extended inclinedly downward from the first hinge part.

The first tilt part and the second tilt part are spaced apart from each other by a predetermined space around the second hinge part, and the space being spaced apart may be extended inclinedly upward from the second hinge part.

A height of the first hinge part from the bottom surface of the fixing part may be higher than a height of the fixing part of the second hinge part from the bottom surface.

The space formed between the first tilt part and the second tilt part of the hinge may comprise a space being extended inclinedly upward from the second hinge part.

The length of the first hinge part in a first direction perpendicular to the optical axis may be smaller than the length of the first hinge part in a second direction perpendicular to the optical axis and the first direction.

The length of the second hinge part in the second direction may be smaller than the length of the first hinge part in the second direction.

The hinge comprises first and second sidewalls, a third sidewall facing the first sidewall of the hinge, and a fourth sidewall facing the second sidewall of the hinge, wherein the fixing part of the hinge comprises first to fourth fixing parts formed on each of the first to fourth sidewalls of the hinge, and a first holder coupled to the first fixing part of the fixing part of the hinge, and wherein the first coil and the second coil may be coupled to the first holder.

The first holder comprises a first sidewall disposed at the outer side of the first fixing part, and a second sidewall being extended from the first sidewall of the first holder and disposed at the outer side of the second fixing part, wherein the hinge comprises a first protrusion being protruded from the outer side surface of the first fixing part, wherein the first holder comprises a hole formed at a position corresponding to the first protrusion of the first fixing part, and wherein the first protrusion of the first fixing part may be coupled to the hole of the first holder.

It comprises a second holder coupled to the second tilt part of the hinge, and a third holder spaced apart from the second holder and disposed in a direction perpendicular to the second holder, wherein the first magnet is coupled to the second holder and the second magnet may be coupled to the third holder.

The second holder comprises: a first portion coupled to the upper surface of the hinge; a second portion being extended from the first portion and disposed on the outer side surface of the second tilt part; and a third portion being extended from the second portion and spaced apart from the outer side surface of the second tilt part, wherein the first magnet may be coupled to the third portion of the second holder.

It comprises a fourth holder coupled to the second tilt part of the hinge, the fourth holder comprises a carrier disposed in the hinge and a flange formed on the carrier, the flange is disposed between the upper surface of the hinge and the first portion of the second holder, the flange comprises a protrusion being protruded from the upper surface of the flange, the second holder comprises a hole formed in the first portion of the second holder and formed at a position corresponding to the protrusion of the flange of the fourth holder, the protrusion of the flange is coupled to the hole of the first portion of the second holder, and the lens driving device may be disposed in the carrier of the fourth holder.

The lens driving device may comprise: a substrate; an image sensor disposed in the substrate; a holder disposed in the substrate; a lens coupled to the holder and disposed at a position corresponding to the image sensor.

The camera module according to a second embodiment of the present invention comprises: a hinge comprising a fixing part, a first tilt part connected through the fixing part and the first hinge part, and a second tilt part connected through the first tilt part and the second hinge part; a first coil coupled to the fixing part of the hinge; a second coil coupled to the fixing part of the hinge and spaced apart from the first coil; a lens driving device coupled to the second tilt part of the hinge; a first magnet coupled to at least one of the first tilt part of the hinge, the second tilt part of the hinge, and the lens driving device and facing the first coil; and a second magnet coupled to at least one of the first tilt part of the hinge, the second tilt part of the hinge, and the lens driving device, facing the second coil, and disposed in a direction perpendicular to the disposed direction of the first magnet, wherein a space formed between the fixing part of the hinge and the first tilt part may comprise a space being extended downwardly from the first hinge part.

The smartphone according to a second embodiment of the present invention may comprise the camera module of claim 1 or claim 14.

Advantageous Effects

Through a first embodiment of the present invention, it is possible to provide a driving device, a camera module, and a portable terminal device capable of preventing friction torque generated when each lens group is moved through zooming in the camera module.

Through the first embodiment of the present invention, it is possible to provide a driving device, a camera module, and a portable terminal device capable of preventing the occurrence of a phenomenon such as lens decentering or lens tilting in which the center of the lens does not coincide with the center axis of the image sensor, when moving each lens group through zooming in the camera module.

In addition, it is possible to provide an ultra-slim and ultra-small driving device, a camera module, and a portable terminal device through the first embodiment of the present invention.

In addition, through the first embodiment of the present invention, it is possible to provide a driving device, a camera module, and a portable terminal device capable of securing a sufficient amount of light by resolving a size limitation of a lens in a lens assembly of an optical system when OIS implementing OIS.

In addition, through the first embodiment of the present invention, it is possible to provide a driving device, a camera module, and a portable terminal device that can exhibit the best optical characteristics by minimizing the occurrence of decentering or tilting phenomenon when implementing OIS.

In addition, through the first embodiment of the present invention, it is possible to provide a driving device, a camera module, and a portable terminal device capable of preventing magnetic field interference with a magnet for AF or Zoom when implementing OIS.

In addition, it is possible to provide a driving device, a camera module, and a portable terminal device capable of implementing OIS with low power consumption through the first embodiment of the present invention.

The second embodiment of the present invention may provide a camera module of a module tilting method for tilting the entire module through a hinge structure.

In addition, the tilting angle can be maximized while minimizing the volume increase through a hinge structure.

In addition, two-axis tilting may be possible with one hinge.

BEST MODE

Figure 1:
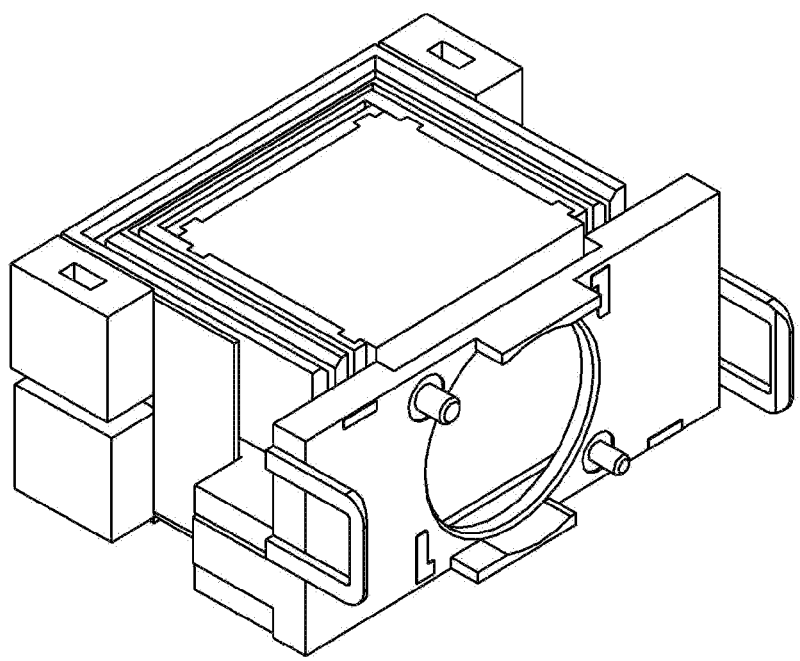
FIG. 1 is a perspective view of a camera module according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

In an embodiment of the present invention, a portable terminal device (not shown) may comprise a main body (not shown), a display part (not shown) disposed on one surface of the main body, and camera modules 10 and 20 disposed on the main body.

A portable terminal device may be any one among cell phones, mobile phones, smart phones, portable smart devices, digital cameras, laptop computers, digital broadcasting terminals, personal digital assistants (PDAs), portable multimedia players (PMPs) and navigation. However, the type of portable terminal device is not limited thereto, and any device for photographing images or photos may be comprised in the portable terminal device.

Hereinafter, a first embodiment of the present invention will be described in more detail with reference to the accompanying drawings.

Figure 2:
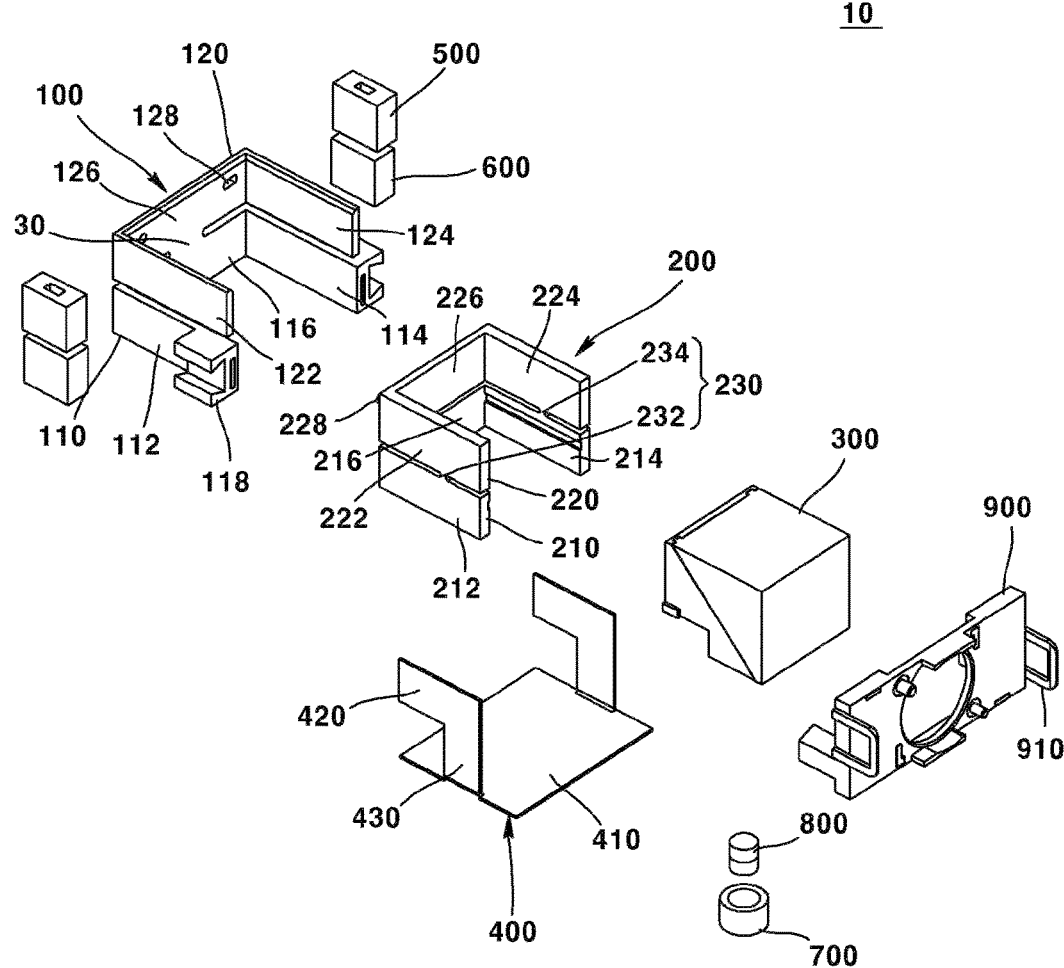
FIG. 2 is an exploded perspective view of the camera module according to a first embodiment of the present invention.
Figure 3:
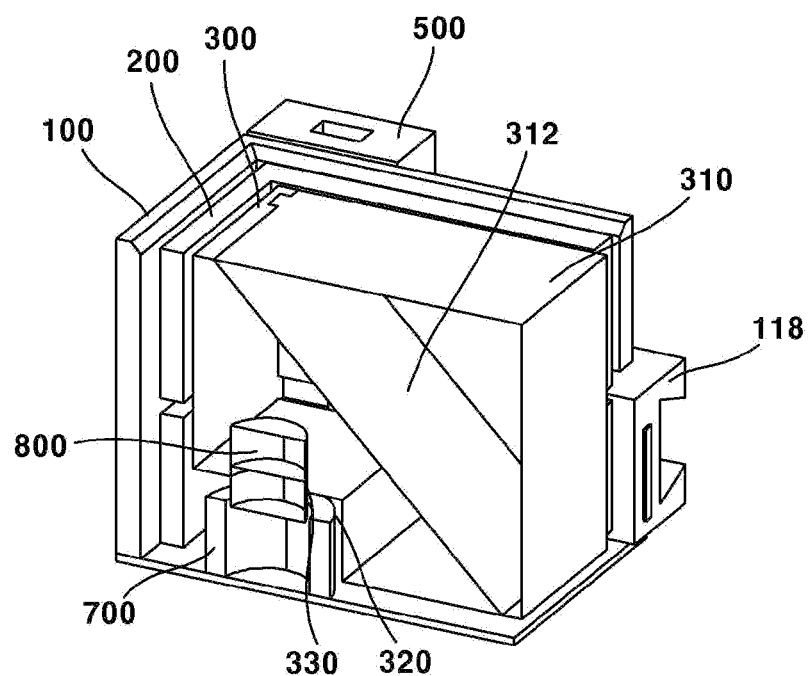
FIG. 3 is a cross-sectional view of a driving device according to a first embodiment of the present invention.
Figure 4:
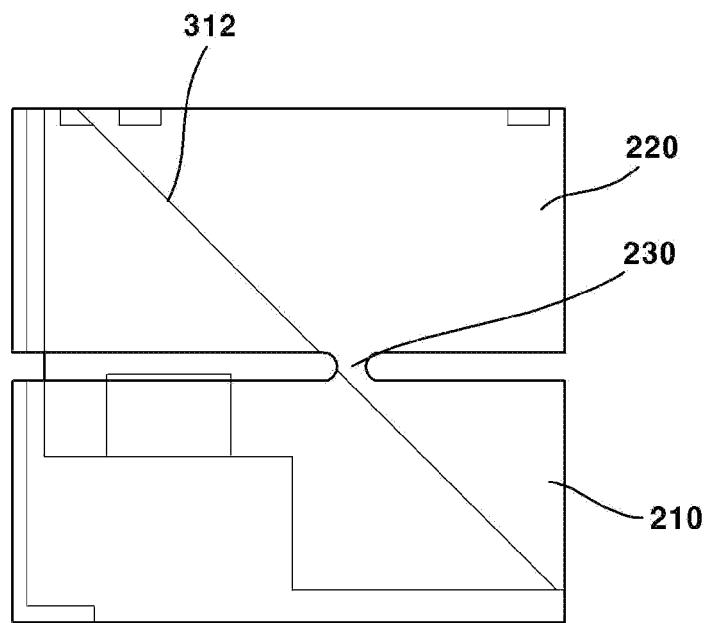
FIG. 4 is a side view of a partial configuration of a driving device according to a first embodiment of the present invention.
Figure 5:
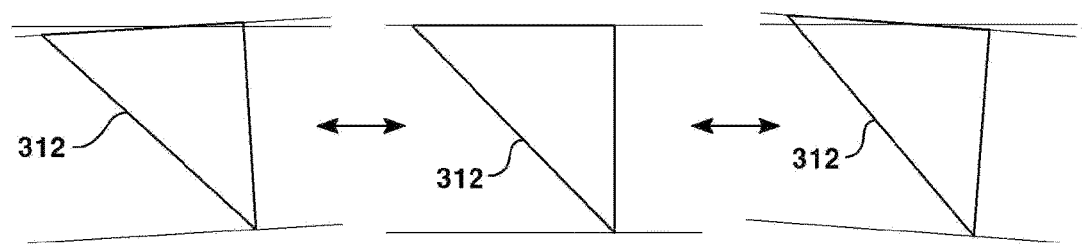
FIG. 5 is an operation diagram of a prism according to a first embodiment of the present invention.

FIG. 1 is a perspective view of a camera module according to a first embodiment of the present invention. FIG. 2 is an exploded perspective view of the camera module according to a first embodiment of the present invention. FIG. 3 is a cross-sectional view of a driving device according to a first embodiment of the present invention. FIG. 4 is a side view of a partial configuration of a driving device according to a first embodiment of the present invention. FIG. 5 is an operation diagram of a prism according to a first embodiment of the present invention. FIGS. 6 to 9 are modified embodiments of the connection part according to a first embodiment of the present invention.

Referring to FIGS. 1 to 5, the camera module 10 according to a first embodiment of the present invention comprises a second guide part 100, a first guide part 200, an optical unit 300, a substrate 400, a first driving part 800, a second driving part 700, a third driving part 500, a fourth driving part 600, and a lens unit 900, but it may be implemented except for some of these components, and additional components are not excluded.

In the first embodiment of the present invention, the camera module 10 may comprise a driving device. The driving device according to the first embodiment of the present invention comprises a second guide part 100, a first guide part 200, an optical unit 300, a substrate 400, a first driving part 800, a second driving part 700, a third driving part 500, and a fourth driving part 600, but it may be implemented except for some of these components, and additional components are not excluded.

The camera module 10 may comprise a second guide part 100. The first guide part 200 may be disposed in the second guide part 100. A third driving part 500 and a fourth driving part 600 may be disposed in the second guide part 100. Through electromagnetic interaction between the third driving part 500 and the fourth driving part 600, the second guide part 100 may rotate the first guide part 200 with respect to a second axis. The second guide part 100 may tilt the optical unit 300 coupled to the first guide part 200 with respect to the second axis. In the first embodiment of the present invention, the second axis may mean the second optical axis of the light reflected from the reflective surface 312 of the prism 310 of the optical unit 300. The second axis may be orthogonal to the first axis.

The second guide part 100 may comprise a second fixing part 110. The second fixing part 110 may be connected to the second moving part 120 through the second connection part 30. The second fixing part 110 may be spaced apart from the second moving part 120 and the second moving part 120 in an up and down direction. A gap may be formed between the second fixing part 110 and the second moving part 120.

A fourth driving part 600 may be disposed in the second fixing part 110. The second fixing part 110 may be coupled to the lens unit 900. The second fixing part 110 may comprise a lens coupling part 118. The lens coupling part 118 of the second fixing part 110 may be coupled to the guide coupling part 910 of the lens unit 900. The lens coupling part 118 of the second fixing part 110 may be snap-fit coupled to the guide coupling part 910 of the lens unit 900.

The second fixing part 110 may comprise three surfaces 112, 114, and 116. The second fixing part 110 may comprise a first surface 112, a second surface 114, and a third surface 116. The first surface 112 of the second fixing part 110 may face the second surface 114 of the second fixing part 110. A fourth driving part 600 may be disposed on the first surface 112 of the second fixing part 110 and the second surface 114 of the second fixing part 110. A lens coupling part 118 may be disposed on the first surface 112 of the second fixing part 110 and the second surface 114 of the second fixing part 110.

The third surface 116 of the second fixing part 110 may connect the first surface 112 of the second fixing part 110 and the second surface 114 of the second fixing part 110. The third surface 116 of the second fixing part 110 may be connected to the third surface 126 of the second moving part 120 through the second connection part 30.

The first surface 112 of the second fixing part 110 may face the first surface 212 of the first moving part 210. The second surface 114 of the second fixing part 110 may face the second surface 214 of the first moving part 210. The third surface 116 of the second fixing part 110 may face the third surface 216 of the first moving part 210.

The second guide part 100 may comprise a second moving part 120. The second moving part 120 may be connected to the second fixing part 110 through the second connection part 30. The second moving part 120 may be spaced apart from the second fixing part 110 in an up and down direction. The second moving part 120 may be disposed in the second fixing part 110. A gap may be formed between the second moving part 120 and the second fixing part 110.

A third driving part 500 may be disposed in the second moving part 120. The second moving part 120 may be coupled to the first guide part 200. In the second moving part 120, a groove 128 to which a protrusion 228 of the first guide part 200 is coupled may be formed. The protrusion 228 of the first guide part 200 may be fitted into the groove 128 of the second moving part 120. Unlike this, a protrusion may be formed in the second moving part 120, and a groove may be formed in the first guide part 200.

The second moving part 120 may be tilted with respect to the second connection part 30 through electromagnetic interaction between the third driving part 500 and the fourth driving part 600. The second moving part 120 may be tilted with respect to the second axis through electromagnetic interaction between the third driving part 500 and the fourth driving part 600.

The second moving part 120 may comprise three surfaces 122, 124, and 126. The second moving part 120 may comprise a first surface 122, a second surface 124, and a third surface 126. The first surface 122 of the second moving part 120 may face the second surface 124 of the second moving part 120. The first surface 122 of the second moving part 120 may be disposed on the first surface 112 of the second fixing part 110. The second surface 124 of the second moving part 120 may be disposed on the second surface 114 of the second fixing part 110. A third driving part 500 may be disposed on the first surface 122 of the second moving part 120 and the second surface 124 of the second moving part 120.

The third surface 126 of the second moving part 120 may connect the first surface 122 of the second moving part 120 and the second surface 124 of the second moving part 120. The third surface 126 of the second moving part 120 may be disposed above the third surface 116 of the second fixing part 110. The third surface 126 of the second moving part 120 may be connected to the third surface 116 of the second fixing part 110 through the second connection part 30. A groove 128 to which the protrusion 228 of the first guide part 200 is coupled may be formed on the third surface 126 of the second moving part 120.

The first surface 122 of the second moving part 120 may face the first surface 222 of the first fixing part 220. The second surface 124 of the second moving part 120 may face the second surface 224 of the first fixing part 220. The third surface 126 of the second moving part 120 may face the third surface 226 of the first fixing part 220.

The second guide part 100 may comprise a second connection part 30. The second connection part 30 may connect the second fixing part 110 and the second moving part 120. The second connection part 30 may hinge-couple the second fixing part 110 and the second moving part 120. The second connection part 30 may connect the third surface 116 of the second fixing part 110 and the third surface 126 of the second moving part 120. The second connection part 30 may tilt the second moving part 120 against the second fixing part 110 with respect to the second axis.

In a first embodiment of the present invention, the second connection part 30 has been described as being integrally formed with the second guide part 100 as an example, but it may be a hinge member separately connecting the second fixing part 110 and the second moving part 120.

The camera module 10 may comprise a first guide part 200. The first guide part 200 may be disposed in the second guide part 100. The first guide part 200 may be tilted with respect to the second axis by the second guide part 100. A second driving part 700 may be disposed in the first guide part 200. The optical unit 300 may be disposed in the first guide part 200. The first guide part 200 may tilt the optical unit 300 with respect to the first axis. In a first embodiment of the present invention, the first axis may be perpendicular to the first optical axis incident on the reflective surface 312 of the prism 310 of the optical unit 300 and the second optical axis reflected from the reflective surface 312. The first axis may be orthogonal to the second axis.

The first guide part 200 may comprise a first fixing part 220. The first fixing part 220 may be disposed in the first moving part 210. The first fixing part 220 may be connected to the second moving part 210 through the first connection part 230. A predetermined gap may be formed between the first fixing part 220 and the first moving part 210.

The first fixing part 220 may be coupled to the second guide part 100. The first fixing part 200 may be coupled to the second moving part 120 of the second guide part 100. The first fixing part 200 may be tilted with respect to the second axis according to the tilting of the second moving part 120 of the second guide part 100. The first fixing part 200 may comprise a protrusion 228 coupled to the hole 128 of the second guide part 100. Unlike this, the first fixing part 200 may comprise a hole (not shown) to which a protrusion (not shown) of the second guide part 100 is coupled.

The first fixing part 220 may comprise three surfaces 222, 224, and 226. The first fixing part 220 may comprise a first surface 222, a second surface 224, and a third surface 226. The first surface 222 of the first fixing part 220 may face the second surface 224 of the first fixing part 220. The third surface 226 of the first fixing part 220 may connect the first surface 222 of the first fixing part 220 and the second surface 224 of the first fixing part 220. The first surface 222 of the first fixing part 220 may be disposed on the first surface 212 of the first moving part 210. The second surface 224 of the first fixing part 220 may be disposed on the second surface 214 of the first moving part 210. The third surface 226 of the first fixing part 220 may be disposed on the third surface 216 of the first moving part 210.

The first surface 222 and the second surface 224 of the first fixing part 220 can be connected to the first surface 212 and the second surface 214 of the first moving part 210 through the first connection part 230, respectively. Specifically, the first surface 222 of the first fixing part 220 may be connected to the first surface 212 of the first moving part 210 through the first-first connection part 232 of the first connection part 230, and the second surface 224 of the first fixing part 220 may be connected to the second surface 214 of the first moving part 210 through the first-second connection part 234 of the first connection part 230.

The third surface 226 of the first fixing part 220 may be coupled to the second guide part 100. The third surface 226 of the first fixing part 220 may be coupled to the second moving part 120 of the second guide part 100. The third surface 226 of the first fixing part 220 may comprise a protrusion 228 coupled to the groove 128 of the second moving part 120 of the second guide part 100. The protrusion 228 of the third surface 226 of the first fixing part 220 may be fit-coupled into the groove 128 of the second moving part 120 of the second guide part 100. Unlike this, when a protrusion (not shown) is formed in the second moving part 120 of the second guide part 100, a groove (not shown) may be formed in the third surface 226 of the first fixing part 220. Through this, the first guide part 200 may be tilted together with the moving part 120 of the second guide part 100 with respect to the second axis.

The first guide part 200 may comprise a first moving part 210. The first moving part 210 may be disposed below the first fixing part 220. The first moving part 210 may be connected to the first fixing part 220 through the first connection part 230. The first moving part 210 may be tilted against the first connection part 230 with respect to the first fixing part 220. The first moving part 210 may be tilted against the first fixing part 220 with respect to the first axis. An optical unit 300 may be coupled to the first moving part 210. The optical unit 300 may be slidably coupled to the first moving part 210. The first moving part 210 may comprise a sliding groove through which the protrusion of the optical unit 300 may slide. Unlike this, when the groove is formed on an outer side surface of the optical unit 300, the first moving part 210 may have a protrusion sliding in the groove formed on the outer side surface of the optical unit 300. Through this, the first moving part 210 may tilt the optical unit 300 with respect to the first axis.

The first moving part 210 may comprise three faces 212, 214, and 216. The first moving part 210 may comprise a first surface 212, a second surface 214, and a third surface 216. The first surface 212 of the first moving part 210 may face the second surface 214 of the first moving part 210. The third surface 216 of the first moving part 210 may connect the first surface 212 of the first moving part 210 and the second surface 214 of the first moving part 210.

The first surface 212 of the first moving part 210 may be disposed below the first surface 222 of the first fixing part 220. The second surface 214 of the first moving part 210 may be disposed below the second surface 224 of the first fixing part 220. The third surface 216 of the first moving part 210 may be disposed below the third surface 226 of the first fixing part 220.

The first surface 212 of the first moving part 210 may face the first surface 112 of the second fixing part 110. The second surface 214 of the first moving part 210 may face the second surface 114 of the second fixing part 110. The third surface 216 of the first moving part 210 may face the third surface 116 of the second fixing part 110.

The first surface 212 and the second surface 214 of the first moving part 210 can be connected to the first surface 222 and the second surface 224 of the second moving part 220 through the first connection part 230, respectively. Specifically, the first surface 212 of the first moving part 210 is connected to the first surface 222 of the second moving part 220 through the first-first connection part 232, and the second surface 214 of the first moving part 210 may be connected to the second surface 224 of the second moving part 220 through the first-second connector 234.

The optical unit 300 may be coupled to the first surface 212 and the second surface 214 of the first moving part 210. The optical unit 300 may be slidably coupled to the first surface 212 and the second surface 214 of the first moving part 210. The first surface 212 and the second surface 214 of the first moving part 210 may comprise sliding grooves through which the protrusion of the optical unit 300 slides.

The first guide part 200 may comprise a first connection part 230. The first connection part 230 may connect the first fixing part 220 and the first moving part 210. The first connection part 230 may hinge-couple the first moving part 210 to the first fixing part 220. The first connection part 230 may comprise: a first-first connection part 232 connecting the first surface 212 of the first moving part 210 and the first surface 222 of the first fixing part 220; and a first-second connection part 234 for connecting the second surface 214 of the first moving part 210 and the second surface 224 of the first fixing part 220.

In the first embodiment of the present invention, the first connection part 230 has been described as being integrally formed with the first guide part 200 as an example, but it may be a hinge member for separately connecting the first fixing part 220 and the first moving part 210.

In a first embodiment of the present invention, the protrusion 228 is formed on the third surface 226 of the first fixing part 220 in which the first connection part 230 is not formed as an example, but unlike this a protrusion 228 may be formed on the first surface 222 and the second surface 224 of the first fixing part 220 on which the first connection part 230 is formed. In this case, the groove 128 of the second moving part 120 of the second guide part 100 into which the protrusions 228 formed on the first surface 222 and the second surface 224 of the first fixing part 220 are inserted may also be formed on the first surface 122 and the second surface 124 of the second moving part 120.

The camera module 10 may comprise an optical unit 300. The optical unit 300 may be disposed in the first guide part 200. The optical unit 300 may be connected to the second guide part 100 through the first guide part 200. The optical unit 300 may be tilted with the first connection part 230 as an axis by the first moving part 210 of the first guide part 200. The optical unit 300 may be tilted with respect to the first axis by the first moving part 210 of the first guide part. The optical unit 300 may be tilted by the second moving part 120 of the second guide part 100 with the second connection part 30 as an axis. The optical unit 300 may be tilted with respect to the second axis by the second moving part 120 of the second guide part 100.

In a first embodiment of the present invention, it has been described that the second guide part 100 is tilted with respect to the second axis and the first guide part 200 is tilted with respect to the first axis, but is not limited thereto. The tilting axes of the first guide part 200 and the second guide part 100 may vary according to the positions of the first connection part 230 and the second connection part 30. Specifically, the third surface 216 of the first moving part 210 and the third surface 226 of the first fixing part 220 may be connected through the first connection part 230. In this case, the first guide part 200 is tilted with respect to the second axis, and the disposement of the first driving part 800 and the second driving part 700 may be changed. The second connection part 30 comprises a second-first connection part (not shown) connecting the first surface 122 of the second moving part 120 and the first surface 112 of the second fixing part 110, and the second moving part A second-second connection part (not shown) connecting the second surface 124 of the part 120 and the second surface 114 of the second fixing part 110 may be comprised. In this case, the second guide part 100 may be tilted with respect to the first axis, and the disposement of the third driving part 500 and the fourth driving part 600 may be changed.

A first driving part 800 may be disposed in the optical unit 300. The optical unit 300 may face a first region 410 of the substrate 400. Grooves 320 and 330 may be formed in a region of the optical unit 300 facing the second driving part 700. Specifically, a first groove 320 in which at least a portion of the second driving part 700 is disposed may be formed in a region of the optical unit 300 facing the second driving part 700. A second groove 330 in which at least a portion of the first driving part 800 is disposed may be formed in a region of the optical unit 300 facing the second driving part 700. A second groove 330 may be formed in the first groove 320 of the optical unit 300. The size of the first groove 320 of the optical unit 300 and the second groove 330 of the optical unit 300 may be different from each other. The size of the first groove 320 of the optical unit 300 may be larger than the size of the second groove 330 of the optical unit 300.

The optical unit 300 may comprise a prism mover and a prism 310 disposed in the prism mover. The first groove 320 and the second groove 330 of the optical unit 300 may be formed in a lower portion the prism mover.

The camera module 10 may comprise a substrate 400. A second driving part 700 may be disposed in the substrate 400. The substrate 400 may be electrically connected to the second driving part 700. The substrate 400 may supply current to the second driving part 700. A third driving part 500 may be disposed in the substrate 400. The substrate 400 may be electrically connected to the third driving part 500.

The substrate 400 may supply current to the third driving part 500. The substrate 400 may be connected to an external power source (not shown).

The substrate 400 may comprise: a first region 410 in which at least a portion of the second driving part 700 is disposed; a second region 420 in which at least a portion of the third driving part 500 is disposed; and a connection part 430 connecting the first region 410 and the second region 420. The first region 410 of the substrate 400 may face the optical unit 300. The first region 410 of the substrate 400 may face the first driving part 800.

The connection part 430 of the substrate 400 may be bent from the first region 410 of the substrate 400. The second region 420 of the substrate 400 may be bent from the connection portion 430 of the substrate 400.

The connection part 430 of the substrate 400 may be coupled to the second guide part 100. The connection part 430 of the substrate 400 may be coupled to the second fixing part 110 of the second guide part 100. The connection part 430 of the substrate 400 may be coupled to the first surface 112 and the second surface 114 of the second fixing part 110 of the second guide part 100.

The substrate 400 may comprise a printed circuit board (PCB). The substrate 400 may comprise a flexible printed circuit board (FPCB).

The camera module 10 may comprise a first driving part 800. The first driving part 800 may be disposed in the optical unit 300. The first driving part 800 may be disposed in the grooves 320 and 330 of the optical unit 300. The first driving part 800 may be disposed in the second groove 330 of the optical unit 300. The first driving part 800 may face the second driving part 700. The first driving part 800 may comprise a magnet. Unlike this, when the second driving part 700 is a magnet, the first driving part 800 may be a coil. The first driving part 800 may tilt the optical unit 300 with respect to the first axis through electromagnetic interaction with the second driving part 700. The first driving part 800 may tilt the first moving part 210 with respect to the first axis against the first fixing part 220 through electromagnetic interaction with the second driving part 700. The first driving part 800 may be formed to be smaller than the second driving part 700.

The camera module 10 may comprise a second driving part 700. The second driving part 700 may be disposed in the substrate 400. The second driving part 700 may be disposed in the first region 410 of the substrate 400. The second driving part 700 may comprise a coil. Unlike this, when the first driving part 800 is a coil, the second driving part 700 may be a magnet. The second driving part 700 may be electrically connected to the substrate 400. The second driving part 700 may receive current from the substrate 400. The second driving part 700 may face the first driving part 800. The second driving part 700 may tilt the optical unit 300 with respect to the first axis through electromagnetic interaction with the first driving part 800. The second driving part 700 may tilt the first moving part 210 against the first fixing part 220 with respect to the first axis through electromagnetic interaction with the first driving part 800. The second driving part 700 may have a smaller height than the first driving part 800. In addition, the second driving part 700 may have a wider direction than the first driving part 800. The second driving part 700 may be formed in a cylindrical shape in which an inner space is formed. At least a partial region of the first driving part 800 may be disposed in at least a portion of the internal space of the second driving part 700.

In a first embodiment of the present invention, the second driving part 800 has been described as being disposed in the substrate 400 as an example, but is not limited thereto, and the second driving part 800 may be disposed in the first fixing part 220.

In the first embodiment of the present invention, the first driving part 800 is a coil and the second driving part 700 is a magnet, but unlike this, the first driving part 800 may be a magnet and the second driving part 700 may be a coil.

The camera module 10 may comprise a third driving part 500. The third driving part 500 may be disposed in the second guide part 100. The third driving part 500 may be disposed in the second moving part 120 of the second guide part 100. The third driving part 500 may be disposed on at least one of the three surfaces 122, 124, and 126 of the second moving part 120 of the second guide part 100. The third driving part 500 may be disposed on the first surface 122 and the second surface 124 of the second moving part 120 of the second guide part 100. The third driving part 500 may face the fourth driving part 600. The third driving part 500 may be disposed in the substrate 400. The third driving part 500 may be disposed in the second region 420 of the substrate 400. The third driving part 500 may be electrically connected to the substrate 400. The third driving part 500 may be electrically connected to the second region 420 of the substrate 400. The third driving part 500 may receive current from the substrate 400. The third driving part 500 may be a coil. The third driving part 500 may tilt the optical unit 300 with respect to the second axis through electromagnetic interaction with the fourth driving part 600. The third driving part 500 may tilt the second moving part 120 against the second fixing part 110 with respect to the second axis through electromagnetic interaction with the fourth driving part 600.

The camera module 10 may comprise a fourth driving part 600. The fourth driving part 600 may be disposed in the second guide part 100. The fourth driving part 600 may be disposed in the first fixing part 110 of the second guide part 100. The fourth driving part 600 may be disposed on at least one of the three surfaces 112, 114, and 116 of the first fixing part 110 of the second guide part 100. The fourth driving part 600 may be disposed on the first surface 112 and the second surface 114 of the second fixing part 110 of the second guide part 100. The fourth driving part 600 may face the third driving part 500. The fourth driving part 600 may be a magnet. The fourth driving part 600 may tilt the optical unit 300 with respect to the second axis through electromagnetic interaction with the third driving part 500. The fourth driving part 600 may tilt the second moving part 120 against the second fixing part 110 with respect to the second axis through electromagnetic interaction with the third driving part 500.

In a first embodiment of the present invention, the third driving part 500 is a coil and the fourth driving part 600 is a magnet as an example, but unlike this, the third driving part 500 is a magnet and the fourth driving part 600 may be a coil.

In the first embodiment of the present invention, although it has been described that the second driving part 700 tilts the optical unit 300 with respect to the first axis through electromagnetic interaction with the first driving part 800, and the third driving part 500 the optical unit 300 is tilted with respect to the second axis through electromagnetic interaction with the fourth driving part 600, but is not limited thereto. Depending on the disposement of the first driving part 800 and the second driving part 700, the optical unit 300 may be tilted with respect to the second axis. According to the disposement of the third driving part 500 and the fourth driving part 600, the optical unit 300 may be tilted with respect to the first axis.

The camera module 10 may comprise a lens unit 900. The lens unit 900 may be coupled to the second guide part 100. The lens unit 900 may be coupled to the second fixing part 110 of the second guide part 100. The lens unit 900 may be coupled to the first surface 112 and the second surface 114 of the second fixing part 110 of the second guide part 100. The lens unit 900 may be coupled to the lens coupling unit 118 disposed on the first surface 112 and the second surface 114 of the second fixing part 110 of the second guide part 100. The lens unit 900 may comprise: a first surface 112 of the second fixing part 110 of the second guide part 100; and a guide coupling part 910 coupled to the lens coupling part 118 disposed on the second surface 114. The guide coupling part 910 may be snap-fit coupled to the lens coupling part 118.

The lens unit 900 may comprise at least one lens. At least one lens of the lens unit 900 may be irradiated with light reflected from the reflective surface 312 of the prism 310 of the optical unit 300.

Various shapes of the first connection part 230 according to a first embodiment of the present invention will be described with reference to FIGS. 6 to 9.

Figure 6:
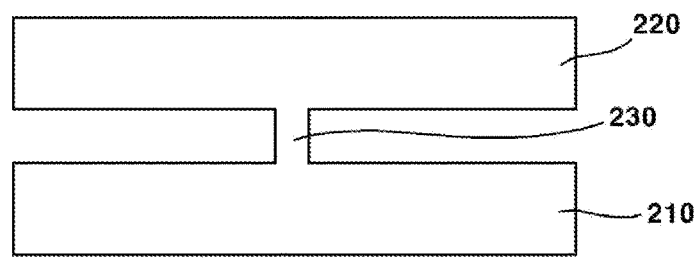
FIGS. 6 to 9 are modified embodiments of the connection part according to a first embodiment of the present invention.

Referring to FIG. 6, the first connection part 230 according to a first embodiment of the present invention may be formed in a rectangular shape. Through this, it is possible to simplify the process of processing the first connection part 230.

Figure 7:
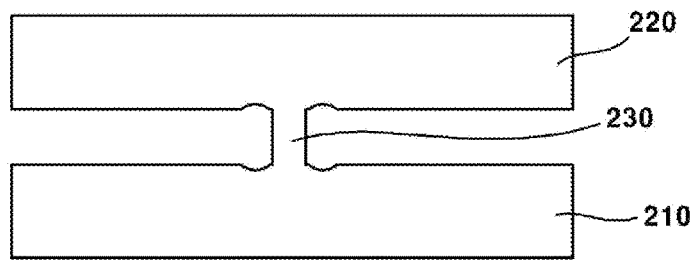

Referring to FIG. 7, a groove may be formed in a region of the first fixing part 220 and the first moving part 310 to which the first connection part 230 according to a first embodiment of the present invention are connected. Through this, the rigidity of the first connection part 230 may be enhanced.

Figure 8:
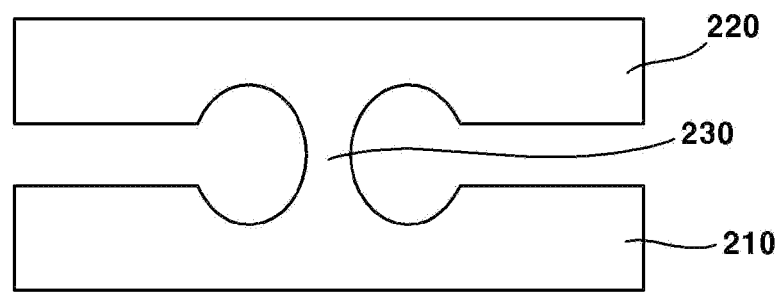
Figure 9:
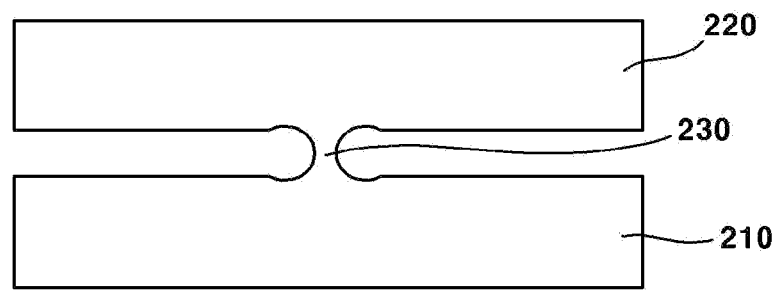

Referring to FIGS. 8 and 9, a groove is formed in a region of the first fixing part 220 and the first moving part 310 to which the first connection part 230 according to a first embodiment of the present invention is connected, and the first connection part 230 may be formed in a curved shape. Through this, the rigidity of the first connection part 230 can be enhanced, and the tilting efficiency with respect to the first axis of the optical unit 300 can be enhanced.

The shape of the second connection part 30 according to a first embodiment of the present invention may also be changed in various ways similar to the shape of the first connection part 230.

The driving device of the camera module 10 according to a first embodiment of the present invention may tilt the optical unit 300 with respect to the first axis and the second axis. In the first embodiment of the present invention, it has been described as an example that the optical unit 300 is tilted with respect to the second axis by the second moving part 120, and the optical unit 300 is tilted with respect to the first axis by the first moving part 210, but unlike this, the optical unit 300 may be tilted with respect to the first axis by the second moving part 120, and the optical unit 300 may be tilted with respect to the second axis by the first moving part 210. In this case, the first connection part 230 connects the third surface 226 of the first fixing part 220 and the third surface 216 of the first moving part 210, and the second connection part 30 may also connect the first surface 112 and the second surface 114 of the second fixing part 110 and the first surface 122 and the second surface 124 of the second moving part 120, respectively.

Figure 10:
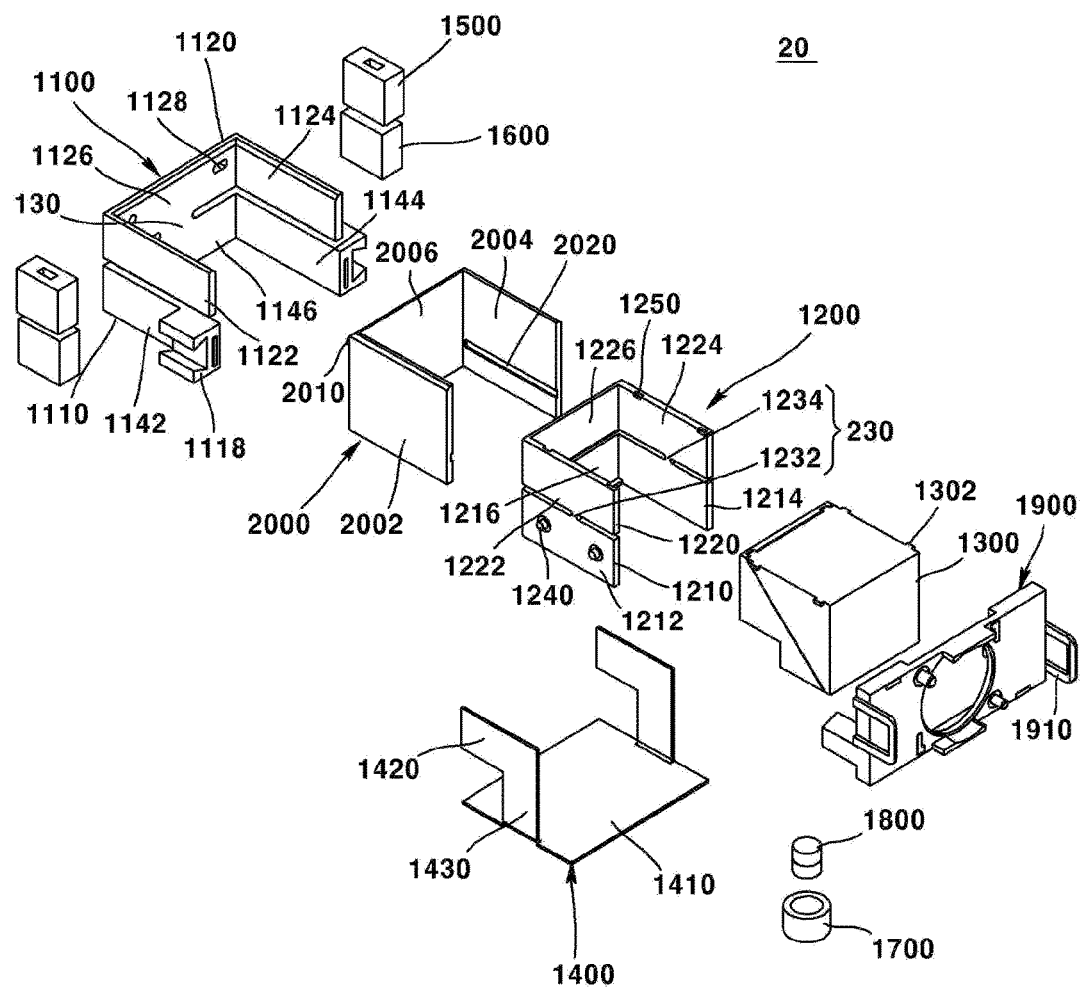
FIG. 10 is an exploded perspective view of a camera module according to another embodiment of the present invention.
Figure 11:
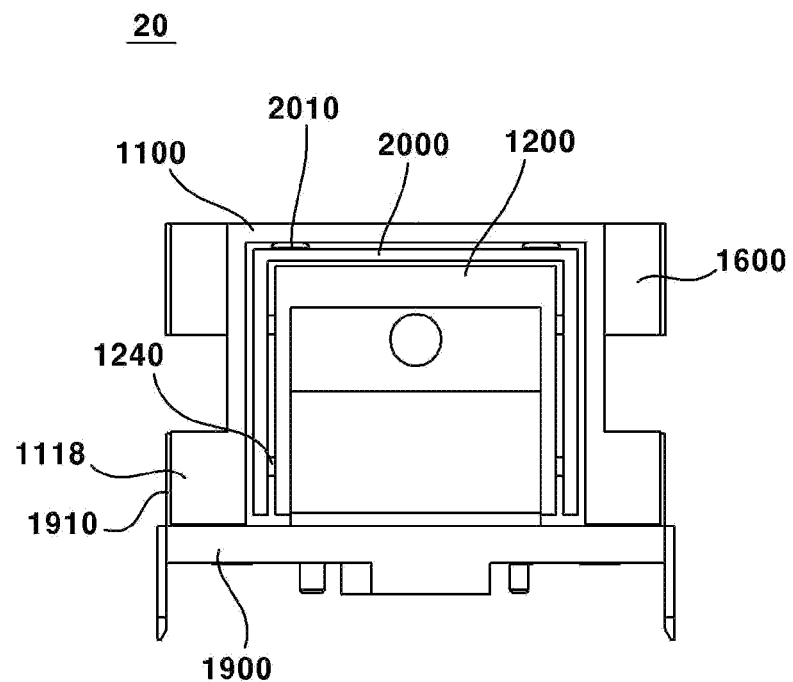
FIG. 11 is a cross-sectional view of a camera module according to another embodiment of the present invention.
Figure 12:
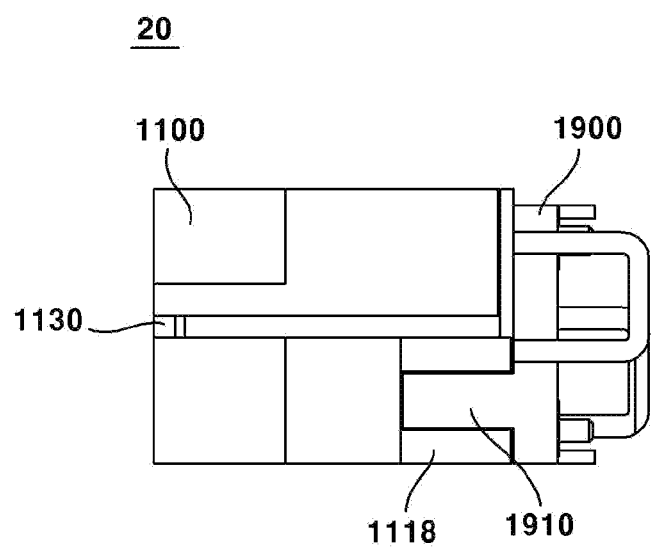
FIG. 12 is a side view of a driving device according to another embodiment of the present invention.
Figure 13:
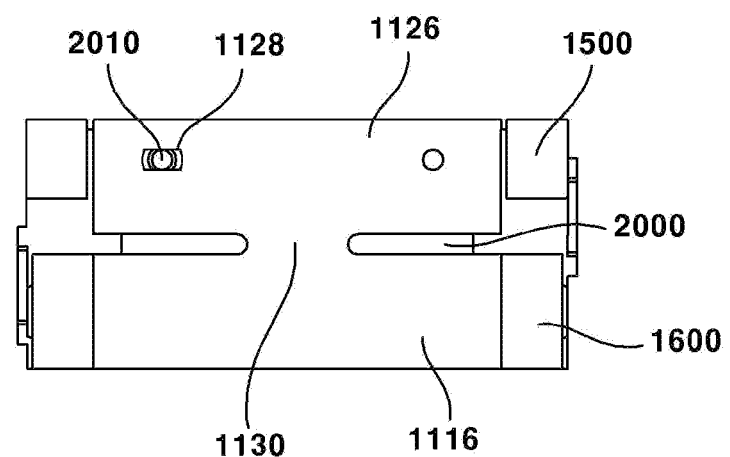
FIG. 13 is a rear view of a driving device according to another embodiment of the present invention.
Figure 14:
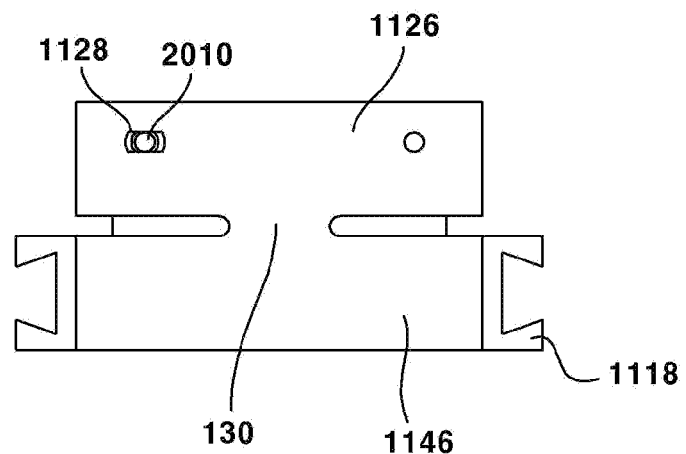
FIG. 14 is a rear view of a driving device with some components removed according to another embodiment of the present invention.
Figure 15:
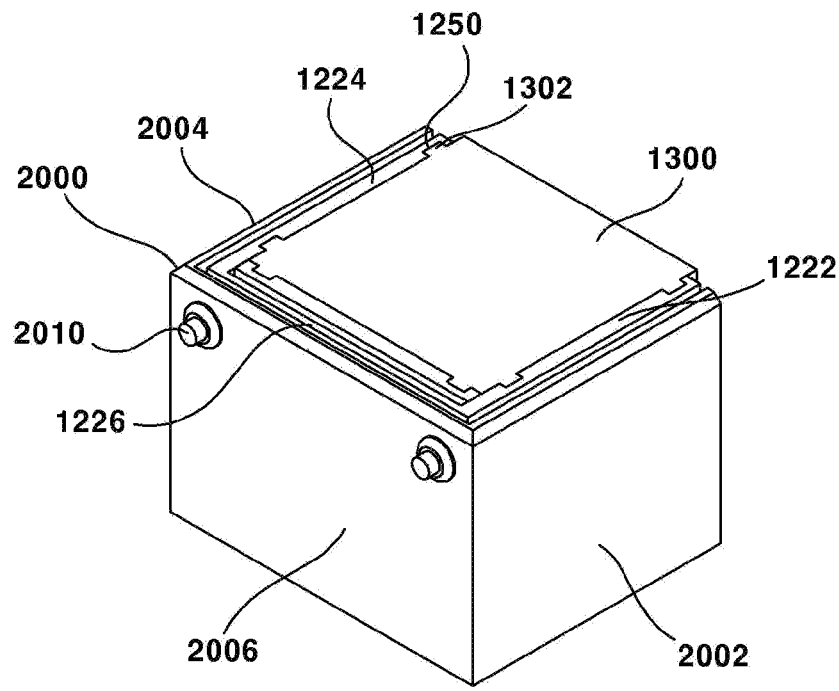
FIG. 15 is a perspective view of a driving device with some components removed according to another embodiment of the present invention.
Figure 16:
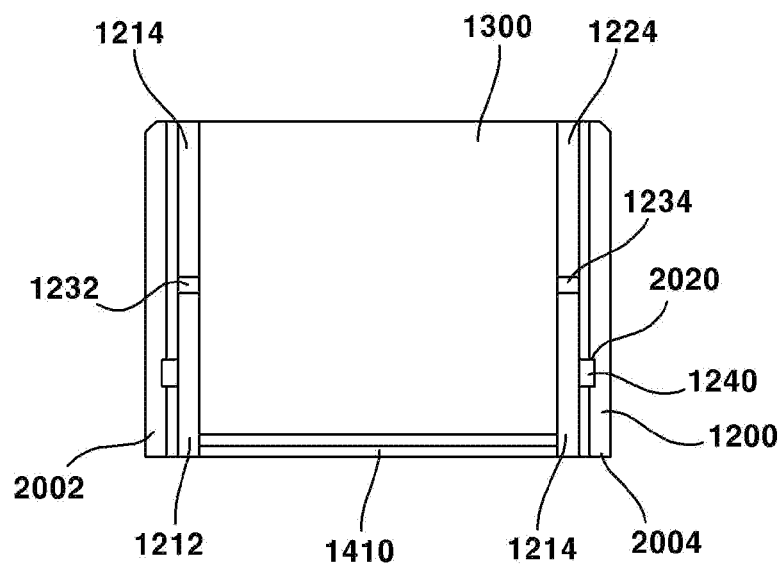
FIG. 16 is a front view of a driving device with some components removed according to another embodiment of the present invention.
Figure 17:
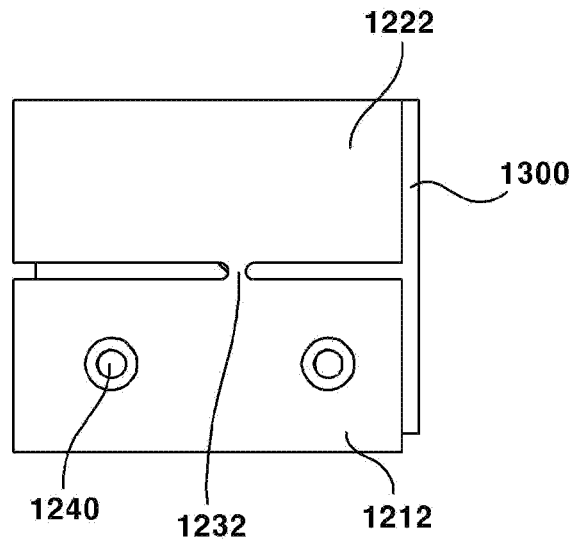
FIG. 17 is a side view of a driving device with some components removed according to another embodiment of the present invention.
Figure 18:
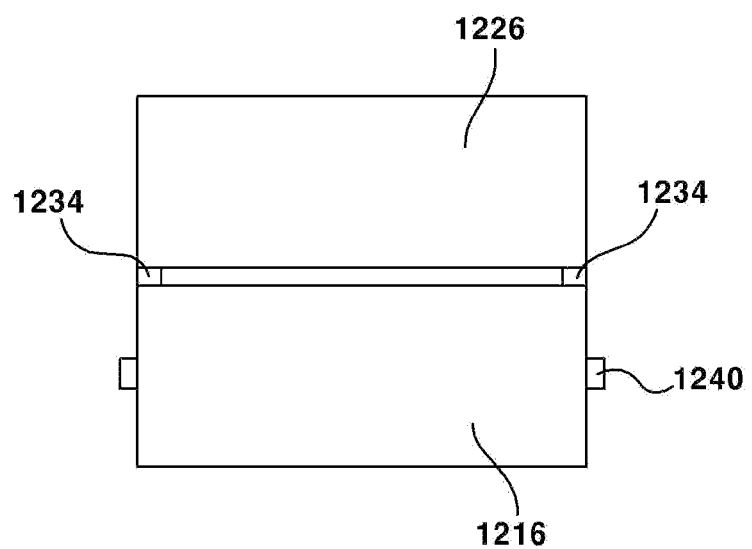
FIG. 18 is a rear view of a driving device with some components removed according to another embodiment of the present invention.

FIG. 10 is an exploded perspective view of a camera module according to another embodiment of the present invention. FIG. 11 is a cross-sectional view of a camera module according to another embodiment of the present invention. FIG. 12 is a side view of a driving device according to another embodiment of the present invention. FIG. 13 is a rear view of a driving device according to another embodiment of the present invention. FIG. 14 is a rear view of a driving device with some components removed according to another embodiment of the present invention. FIG. 15 is a perspective view of a driving device with some components removed according to another embodiment of the present invention. FIG. 16 is a front view of a driving device with some components removed according to another embodiment of the present invention. FIG. 17 is a side view of a driving device with some components removed according to another embodiment of the present invention. FIG. 18 is a rear view of a driving device with some components removed according to another embodiment of the present invention.

Referring to FIGS. 10 to 18, the camera module 20 according to another embodiment of the present invention may comprise: a second guide part 1100; a first guide part 1200; an optical unit 1300; a substrate 1400; a first driving part 1800; a second driving part 1700; a third driving part 1500; a fourth driving part 1600; a lens unit 1900, and a third guide part 2000, but it may be implemented except for some of these components, and additional components are not excluded.

In another embodiment of the present invention, the camera module 20 may comprise a driving device. The driving device according to another embodiment of the present invention may comprise: a second guide part 1100; a first guide part 1200; an optical unit 1300; a substrate 1400; a first driving part 1800; a second driving part 1700; a third driving part 1500; a fourth driving part 1600; and a third guide part 2000, but it may be implemented except for some of these components, and additional components are not excluded.

Hereinafter, differences from the camera module 10 according to a first embodiment of the present invention will be mainly described.

Each of the second guide part 1100, the first guide part 1200, the optical unit 1300, the substrate 1400, the first driving part 1800, the second driving part 1700, the third driving part 1500, the fourth driving part 1600, and the lens unit 1900 according to another embodiment of the present invention that is not described below, may be understood to be the same as the second guide part 100, the first guide part 200, the optical unit 300, the substrate 400, the first driving part 800, the second driving part 700, the third driving part 500, the fourth driving part 600, and the lens unit 900 according to the first embodiment of the present invention.

The camera module 20 according to another embodiment of the present invention may comprise a third guide unit 2000. The third guide part 2000 may be disposed between the first guide part 1200 and the second guide part 1100. The third guide part 2000 may be coupled to the second moving part 1120 of the second guide part 1100. The third guide part 2000 may be tilted with respect to the second axis by the second moving part 1120 of the second guide part 1100. The first guide part 1200 may be coupled to the second guide part 1100. The first guide part 1200 may be slidably coupled to the second guide part 1100. The second guide part 1100 may comprise a sliding groove 2020 through which the protrusion 1240 of the first guide part 1200 slides.

The third guide part 2000 may comprise three surfaces 2002, 2004, and 2006. The third guide part 2000 may comprise a first surface 2002, a second surface 2004, and a third surface 2006. The first surface 2002 of the third guide part 2000 may face the second surface 2004. The third surface 2006 of the third guide part 2000 may connect the first surface 2002 of the third guide part 2000 and the second surface 2004 of the third guide part 2000.

The first surface 2002 of the third guide part 2000 may face the first surface 1112 of the second fixing part 1110 of the second guide part 1100. The first surface 2002 of the third guide part 2000 may face the first surface 1122 of the second moving part 1120 of the second guide part 1100. The first surface 2002 of the third guide part 2000 may face the first surface 1222 of the first moving part 1220 of the first guide part 1200. The first surface 2002 of the third guide part 2000 may face the first surface 1212 of the first fixing part 1210 of the first guide part 1200.

The second surface 2004 of the third guide part 2000 may face the second surface 1114 of the second fixing part 1110 of the second guide part 1100. The second surface 2004 of the third guide part 2000 may face the second surface 1124 of the second moving part 1120 of the second guide part 1100. The second surface 2004 of the third guide part 2000 may face the second surface 1224 of the first moving part 1220 of the first guide part 1200. The second surface 2004 of the third guide part 2000 may face the second surface 1214 of the first fixing part 1210 of the first guide part 1200.

The third surface 2006 of the third guide part 2000 may face the third surface 1116 of the second fixing part 1110 of the second guide part 1100. The third surface 2006 of the third guide part 2000 may face the third surface 1126 of the second moving part 1120 of the second guide part 1100. The third surface 2006 of the third guide part 2000 may face the third surface 1226 of the first moving part 1220 of the first guide part 1200. The third surface 2006 of the third guide part 2000 may face the third surface 1216 of the first fixing part 1210 of the first guide part 1200.

The third surface 2006 of the third guide part 2000 may be coupled to the second moving part 1120 of the second guide part 1100. The third surface 2006 of the third guide part 2000 may be coupled to the third surface 1126 of the second moving part 1120 of the second guide part 1100. The third surface 2006 of the third guide part 2000 may be coupled to a groove 1128 formed in the third surface 1126 of the second moving part 1120 of the second guide part 1100. The third surface 2006 of the third guide part 2000 may be fitted into the groove 1128 formed on the third surface 1126 of the second moving part 1120 of the second guide part 1100. The third surface 2006 of the third guide part 2000 may comprise a protrusion 2010 coupled to the groove 1128 formed on the third surface 1126 of the second moving part 1120 of the second guide part 1100. In another embodiment of the present invention, it will be described as an example that a protrusion 2010 is formed on the third surface 2006 of the third guide part 2000, and a groove 1128 is formed on the third surface 1126 of the second moving part 1120 of the second guide part 1100, but a groove is formed on the third surface 2006 of the third guide part 2000 and a protrusion may be formed on the third surface 1126 of the second moving part 1120 of the second guide part 1100. Through this, the third guide part 2000 may be tilted according to the tilting of the second moving part 1120 of the second guide part 1100.

The first guide part 1200 may be coupled to the first surface 2002 and the second surface 2004 of the third guide part 2000. On the first surface 2002 and the second surface 2004 of the third guide part 2000, a protrusion 1240 formed on the first surface 1212 and the second surface 1214 of the first fixing part 1210 of the first guide part 1200 may be slidably coupled. The first surface 2002 and the second surface 2004 of the third guide part 2000 may comprise a groove 2020 in which a protrusion 1240 formed on the first surface 1212 and the second surface 1214 of the first fixing part 1210 of the first guide part 1200 is coupled.

The first surface 2002 and the second surface 2004 of the third guide part 2000 may comprise a sliding groove 2020 to which the protrusion 1240 formed on the first surface 1212 and the second surface 1214 of the first fixing part 1210 of the first guide part 1200 is slidably coupled. The sliding groove 2020 may be formed to be extended in a second axis direction. Through this, the third guide unit 2000 may tilt the first fixing part 1210 of first guide part 1200 according to the tilting of the second moving part 1120 of the second guide part 1100.

The first guide part 1200 may be coupled to the third guide part 2000. The first guide part 1200 may be slidably coupled to the third guide part 2000. The first fixing part 1210 of the first guide part 1200 may be disposed below the first moving part 1220. The first fixing part 1210 of the first guide part 1200 may be coupled to the third guide part 2000. The first fixing part 1210 of the first guide part 1200 may be coupled to the first surface 2002 and the second surface 2004 of the third guide part 2000. The first fixing part 1210 of the first guide part 1200 may comprise a protrusion 1240 coupled to the third guide part 2000. The protrusion 1240 of the first fixing part 1210 of the first guide part 1200 may be formed on the first surface 1212 and the second surface 1214 of the first fixing part 1210.

The second guide part 1100 may be coupled to the first guide part 1200 by the third guide part 2000. The second moving part 1220 of the second guide part 1100 may be coupled to the first fixing part 1220 of the first guide part 1200 by the third guide part 2000.

The first guide part 1200 may be coupled to the second guide part 1100 by the third guide part 2000. The first fixing part 1220 of the first guide part 1200 may be coupled to the second moving part 1220 of the second guide part 1100 by the third guide part 2000.

An optical unit 1300 may be disposed in the first guide part 1200. An optical unit 1300 may be coupled to the first moving part 1220 of the first guide part 1200. The optical unit 1300 may be coupled to the first surface 1222 and the second surface 1224 of the first moving part 1220 of the first guide part 1200. An optical unit 1300 may be coupled to an upper region of the first surface 1222 and the second surface 1224 of the first moving part 1220 of the first guide part 1200. A groove 1250 to which the optical unit 1300 is coupled may be formed in an upper region of the first surface 1222 and the second surface 1224 of the first moving part 1220 of the first guide part 1200. A protrusion 1302 of the optical unit 1300 may be seated in the groove 1250 formed in the upper region of the first surface 1222 and the second surface 1224 of the first moving part 1220 of the first guide part 1200. Through this, the optical unit 1300 may be tilted according to the tilting of the first moving part 1220 of the first guide part 1200.

In another embodiment of the present invention, the groove 1128 of the second moving part 1120 of the second guide part 1100 may be formed on the first surface 1122 and the second surface 1124 of the second moving part 1120. In this case, the protrusion 2010 of the third guide part 2000 may be formed on the third surface 2006 of the third guide part 2000.

Hereinafter, a configuration of a lens driving device according to a second embodiment of the present invention will be described with reference to the drawings.

Figure 19:
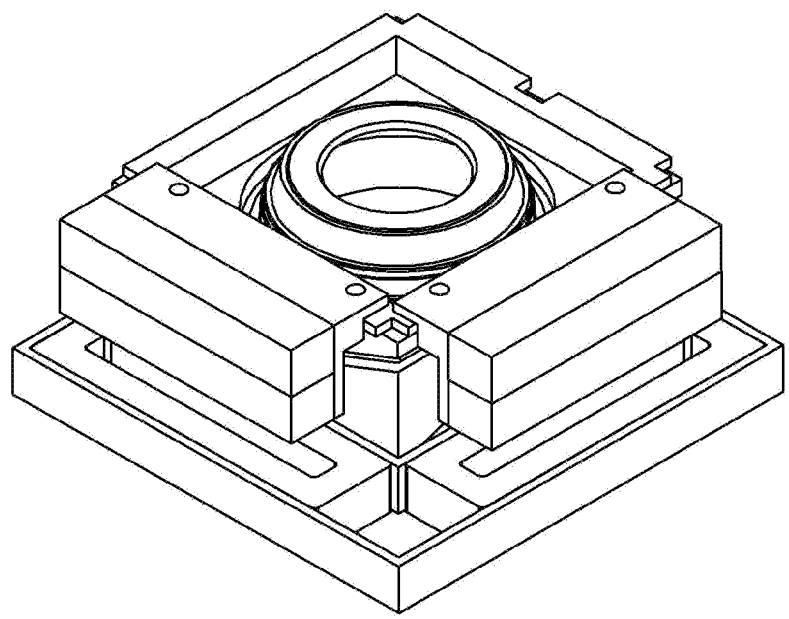
FIG. 19 is a perspective view of a camera module according to a second embodiment of the present invention.
Figure 20:
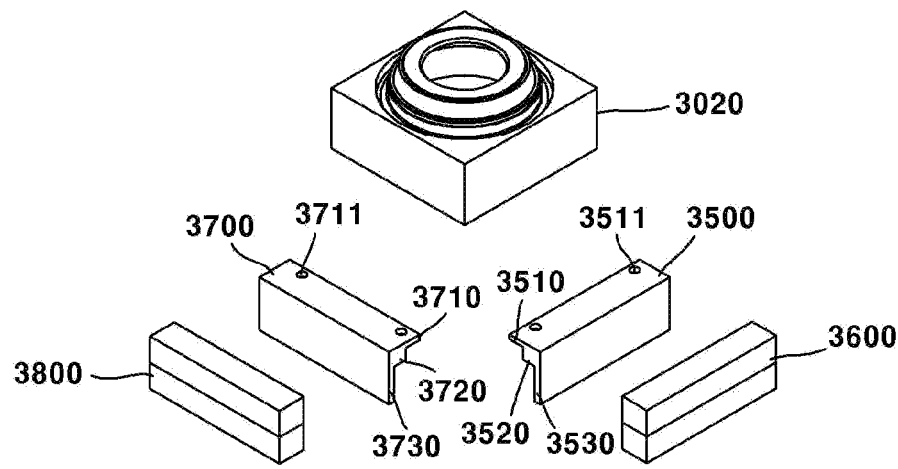
FIG. 20 is an exploded perspective view of a camera module according to a second embodiment of the present invention.
Figure 20:
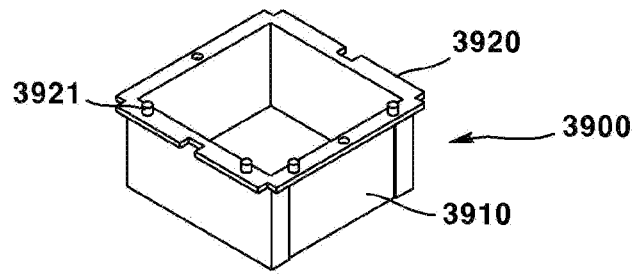
Figure 20:
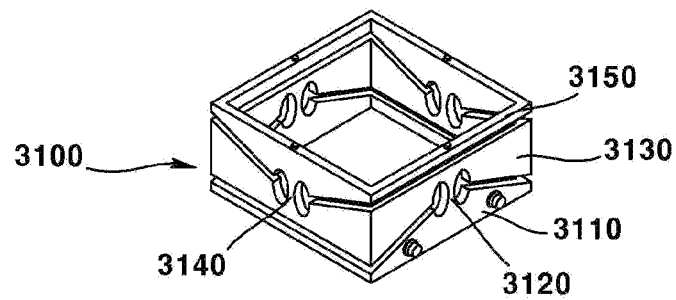
Figure 20:
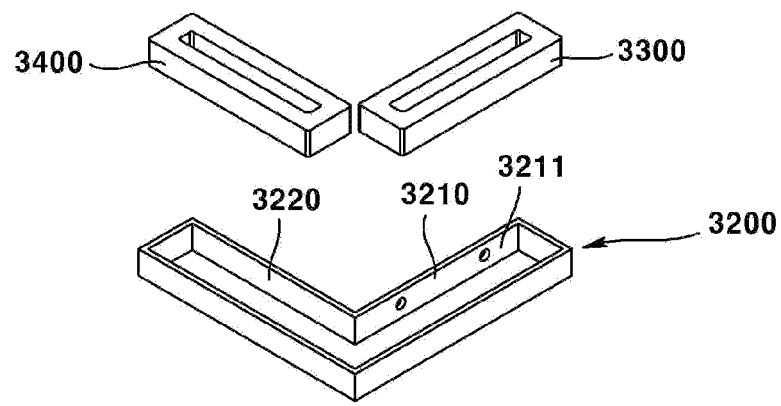
Figure 21:
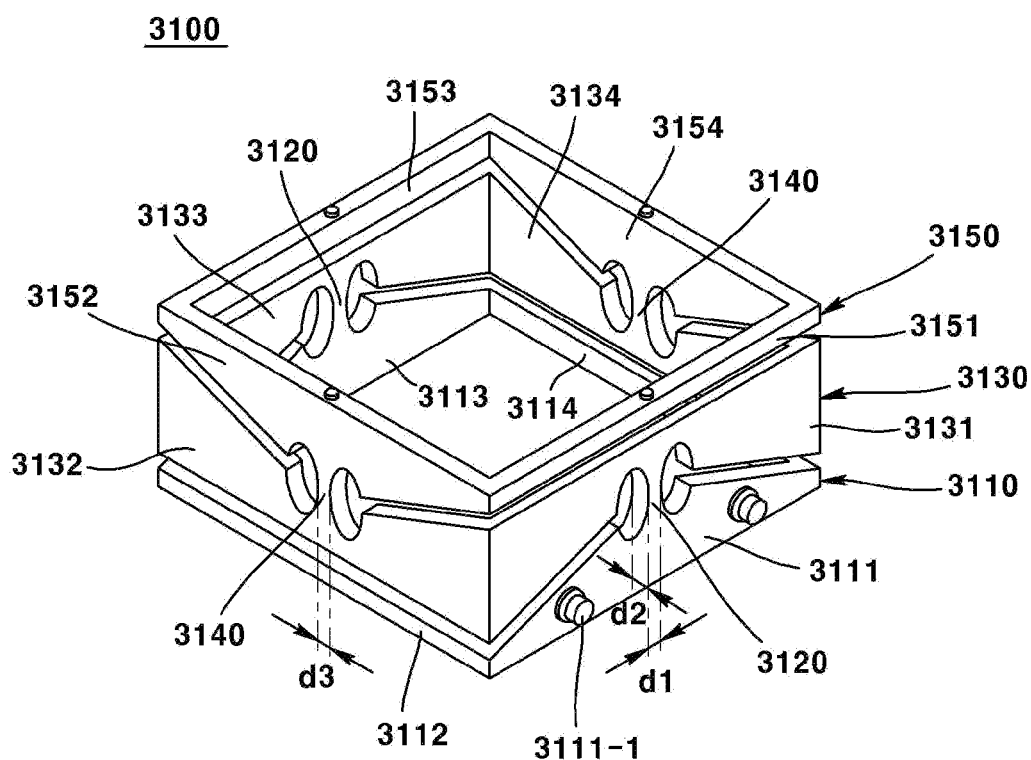
FIG. 21 is a perspective view of a partial configuration of a camera module according to a second embodiment of the present invention.
Figure 22:
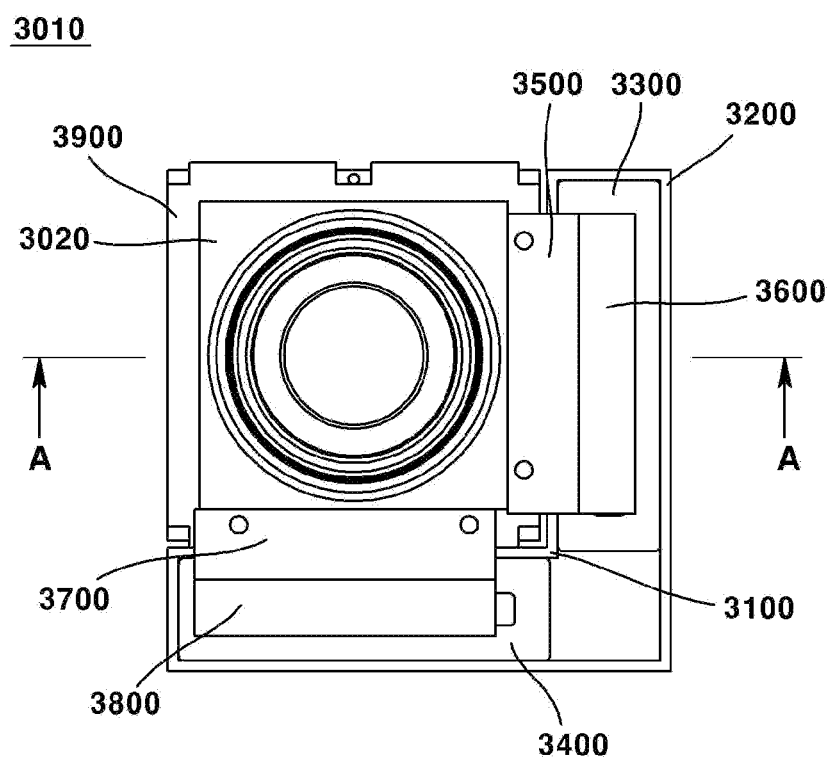
FIG. 22 is a plan view of a camera module according to a second embodiment of the present invention.
Figure 23:
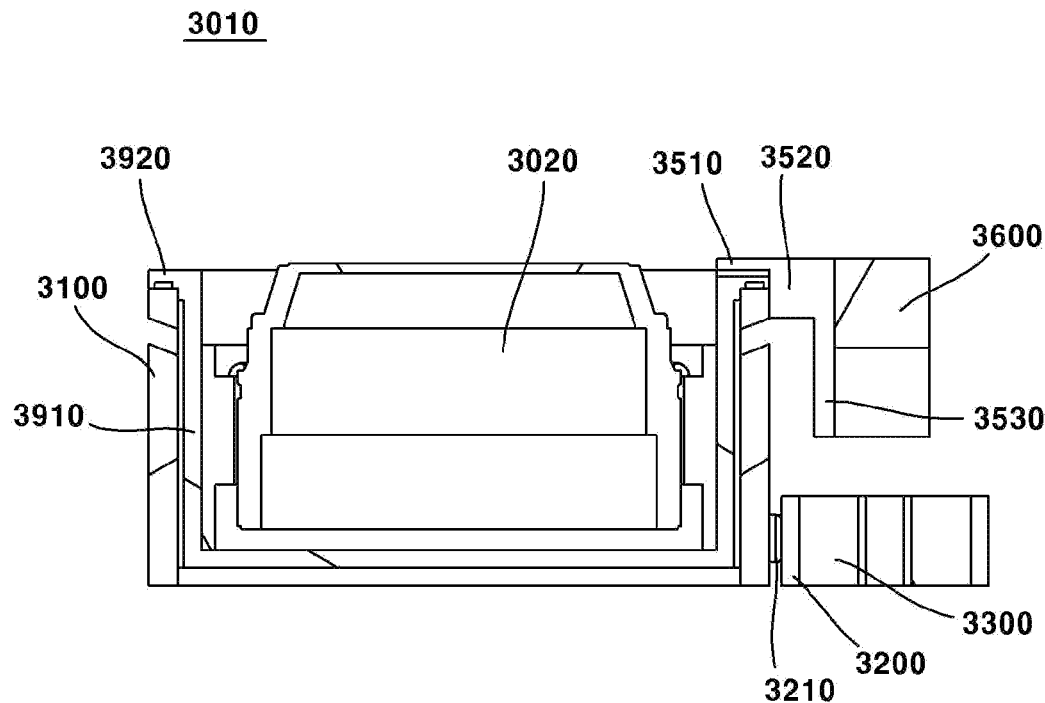
FIG. 23 is a cross-sectional view taken along line A-A of FIG. 22.
Figure 24:
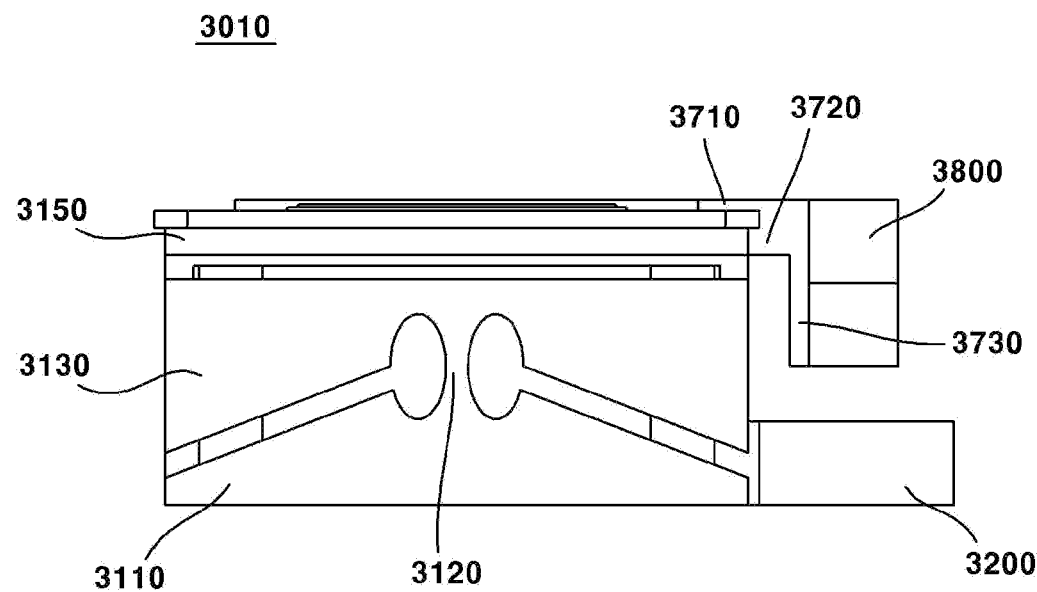
FIGS. 24 and 25 are side views of a camera module according to a second embodiment of the present invention.
Figure 25:
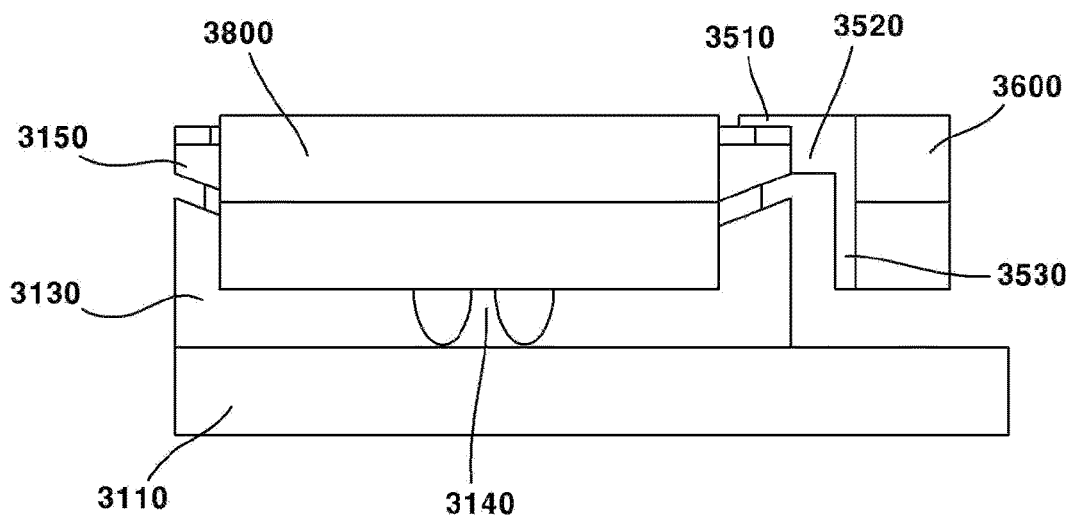

FIG. 19 is a perspective view of a camera module according to a second embodiment of the present invention. FIG. 20 is an exploded perspective view of a camera module according to a second embodiment of the present invention. FIG. 21 is a perspective view of a partial configuration of a camera module according to a second embodiment of the present invention. FIG. 22 is a plan view of a camera module according to a second embodiment of the present invention. FIG. 23 is a cross-sectional view taken along line A-A of FIG. 22. FIGS. 24 and 25 are side views of a camera module according to a second embodiment of the present invention.

The camera module 3010 may comprise a hinge 3100. The hinge 3100 may comprise a hexahedral shape with upper and lower surfaces open. The hinge 3100 may comprise first and second sidewalls, a third sidewall facing the first sidewall, and a fourth sidewall facing the second sidewall. A lens driving device 3020 may be disposed inside the hinge 3100. The hinge 3100 may be coupled to the lens driving device 3020.

The hinge 3100 may comprise a fixing part 3110. The fixing part 3110 may be connected to the first tilt part 3130. The fixing part 3110 may be connected to the first hinge part 3120. The fixing part 3110 may be disposed under the first tilt part 3130. At least a portion of the fixing part 3110 may be spaced apart from the first tilt part 3130 in the optical axis direction. The fixing part 3110 may be connected to the first tilt part 3130 through the first hinge part 3120. The fixing part 3110 may be disposed at the lower portion of the hinge 3100.

The fixing part 3110 may comprise a first fixing part 3111 disposed on the first sidewall of the hinge 3100. The fixing part 3110 may comprise a second fixing part 3112 disposed on the second sidewall of the hinge 3100. The fixing part 3110 may comprise a third fixing part 3113 disposed on the third sidewall of the hinge 3100. The fixing part 3100 may comprise a fourth fixing part 3114 disposed on a fourth sidewall of the hinge 3100. The first fixing part 3111 may be formed symmetrically with respect to the third fixing part 3113 and the optical axis. The first fixing part 3111 may face the third fixing part 3113. The first fixing part 3111 may be coupled to a first holder 3200. The second fixing part 3112 may face the fourth fixing part 3114. The second fixing part 3112 may be formed symmetrically with respect to the fourth fixing part 3114 and the optical axis. The first to fourth fixing parts 3111, 3112, 3113, and 3114 may be integrally formed.

The first fixing part 3111 may be formed inclined downward from the first hinge part 3120. The fixing part 3110 may comprise a first protrusion 311-1. The first protrusion 311-1 may be formed in the first fixing part 3111. The first protrusion 311-1 may be formed to be protruded from the outer surface of the first fixing part 3111. The first protrusion 311-1 may be coupled to the hole 3211 of the first holder 3200. The first protrusion 311-1 may be inserted into the hole 3211 of the first holder 3200.

The hinge 3100 may comprise a first hinge part 3120. At least a portion of the first hinge part 3120 may comprise a curved shape. The first hinge part 3120 may comprise a curved surface. The first hinge part 3120 may be connected to the fixing part 3110. The first hinge part 3120 may be connected to the first tilt part 3130. The first hinge part 3120 may be disposed between the fixing part 3110 and the first tilt part 3130. The first hinge part 3120 may connect the fixing part 3110 and the first tilt part 3130. The first hinge part 3120 may comprise a plurality of first hinge parts 3120. The plurality of first hinge parts 3120 may comprise two first hinge parts 3120. One of the two first hinge parts 3120 may be formed on the first sidewall of the hinge 3100. The other of the two first hinge parts 3120 may be formed on the third sidewall of the hinge 3100. The hinge 3010 may be tilted using an imaginary straight line connecting the centers of each of the two first hinge parts 3120 as a first axis. The first tilt part 3130 and the second tilt part 3150 may be tilted using an imaginary straight line connecting the centers of each of the two first hinge parts 3120 as a first axis. The first tilt part 3130 may be tilted by using an imaginary straight line connecting the centers of each of the two first hinge parts 3120 as a first axis. At this time, the fixing part 3110 may not be tilted. The first tilt part 3130 may be tilted against the fixing part 3110 with respect to the first hinge part 3120. The first tilt part 3130 may be tilted against the fixing part 3110 with respect to the first axis connecting the two first hinge parts 3120. A tilting direction with the first hinge part 3120 as an axis and a tilting direction with the second hinge part 3140 as an axis may be directions orthogonal to each other. A tilting direction with the first hinge part 3120 as a first axis and a tilting direction with the second hinge part 3140 as a second axis may be orthogonal to each other.

The height from the bottom surface of the hinge 3100 of the first hinge part 3120 may be greater than the height in the corresponding direction of the second hinge part 3140. The height from the bottom surface of the first fixing part 3111 of the first hinge part 3120 may be greater than the height from the bottom surface of the second fixing part 3112 of the second hinge part 3140. At least a portion of the first hinge part 3120 may be disposed higher than the second hinge part 3140. The length between the lower surface of the first hinge part 3120 and the fixing part 3100 in the optical axis direction may be greater than the length between the lower surface of the second hinge part 3140 and the fixing part 3100 in the corresponding direction. The first hinge part 3120 of the first tilt part 3130 positioned relatively lower than the second tilt part 3150 can be placed at a higher position than the second hinge part 3140 of the second tilt part 3150 positioned relatively above the first tilt part 3130. A length d1 of the first hinge part 3120 in a first direction perpendicular to the optical axis may be smaller than a length d2 of the first hinge part 3120 in a second direction perpendicular to the optical axis and the first direction. Through this, a tilting angle with respect to the first hinge part 3120 as an axis may be increased. In addition, it is possible to prevent sagging of the space between the first tilt part 3130 and the fixing part 3110. In addition, it is possible to prevent the first tilt part 3130 from being moved in an unwanted direction with the first hinge part 3120 as an axis.

The hinge 3100 may comprise a first tilt part 3130. The first tilt part 3130 may be connected to the fixing part 3110. The first tilt part 3130 may be connected to the first hinge part 3120. The first tilt part 3130 may be connected to the fixing part 3110 through the first hinge part 3120. The first tilt part 3130 may be disposed above the fixing part 3110. At least a portion of the first tilt part 3130 may be spaced apart from the fixing part 3110 in the optical axis direction. The first tilt part 3130 may be disposed below the second tilt part 3150. At least a portion of the first tilt part 3130 may be spaced apart from the first tilt part 3150 in the optical axis direction. The first tilt part 3130 may be disposed between the fixing part 3110 and the second tilt part 3150.

The first tilt part 3130 may comprise: a first-first tilt part 3131 formed on the first sidewall of the hinge 3100; a first-second tilt part 3132 formed on the second sidewall of the hinge 3100; a first-third tilt part 3133 formed on the third sidewall of the hinge 3100; and a first-fourth tilt part 3134 formed on the fourth sidewall of the hinge 3100. The first-first to first-fourth tilt parts 3131, 3132, 3133, and 3134 may be integrally formed.

The first-first tilt part 3131 may be disposed in the first fixing part 3111. The first-first tilt part 3131 may be connected to the first fixing part 3111 through the first hinge part 3120. At least a portion of the first-first tilt part 3131 may be spaced apart from the first fixing part 3111. The first-first tilt part 3131 may be disposed below the second-first tilt part 3151. The first-first tilt part 3131 may be spaced apart from the second-first tilt part 3151. The lower end of the first-first tilt part 3131 may be formed inclined downward from the first hinge part 3120. The lower end of the first-first tilt part 3131 may be formed in a shape corresponding to the upper end of the first fixing part 3111. The upper end of the first-first tilt part 3131 may be formed in a shape corresponding to the shape of the lower end of the second-first tilt part 3151.

The first-second tilt part 3132 may be disposed in the second fixing part 3112. The first-second tilt part 3132 may be spaced apart from the second fixing part 3112. The first-second tilt part 3132 may be connected to the second-second tilt part 3152 through the second hinge part 3140. At least a portion of the first-second tilt part 3132 may be spaced apart from the second-second tilt part 3152. The first-second tilt part 3132 may be disposed below the second-second tilt part 3152. The upper end of the first-second tilt part 3132 may be formed inclined upward from the second hinge part 3140. The upper end of the first-second tilt part 3132 may be formed in a shape corresponding to the lower end of the second-second tilt part 3152. The lower end of the first-second tilt part 3132 may be formed in a shape corresponding to the second fixing part 3112.

The first-third tilt part 3133 may be disposed in the third fixing part 3113. At least a portion of the first-third tilt part 3133 may be spaced apart from the third fixing part 3113. The first-third tilt part 3133 may be connected to the third fixing part 3113 through the first hinge part 3120. The first-third tilt part 3133 may be disposed below the second-third tilt part 3153. The first-third tilt part 3133 may be spaced apart from the second-third tilt part 3153. The lower end of the first-third tilt part 3133 may be formed inclined downward from the first hinge part 3120. The lower end of the first-third tilt part 3133 may be formed in a shape corresponding to the upper end of the third fixing part 3113. The upper end of the first-third tilt part 3133 may be formed in a shape corresponding to the lower end of the second-third tilt part 3153.

The first-fourth tilt part 3134 may be disposed in the fourth fixing part 3114. The first-fourth tilt part 3134 may be spaced apart from the fourth fixing part 3114. The first-fourth tilt part 3134 may be connected to the second-fourth tilt part 3154 through the second hinge part 3140. The first-fourth tilt part 3134 may be disposed below the second-fourth tilt part 3154. At least a portion of the first-fourth tilt part 3134 may be spaced apart from the second-fourth tilt part 3154. The upper end of the first-fourth tilt part 3134 may be formed in a shape corresponding to that of the second-fourth tilt part 3154. The lower end of the first-fourth tilt part 3134 may be formed in a shape corresponding to the fourth fixing part 3114.

The first tilt part 3130 may be coupled to the first magnet 3600. At least a portion of the first tilt part 3130 may be coupled to the first magnet 3600. The first-first tilt part 3131 of the first tilt part 3130 may be coupled to the first magnet

3600. The first tilt part 3130 may be coupled to the second magnet 3800. At least a portion of the first tilt part 3130 may be coupled to the second magnet 3800. The first-second tilt part 3132 of the first tilt part 3130 may be coupled to the second magnet 3800.

The first tilt part 3130 may be tilted with respect to the fixing part 3110 with respect to the first hinge part 3120. The first tilt part 3130 may be tilted against the fixing part 3110 with an imaginary line connecting the two first hinge parts 3120 as a first axis.

The hinge 3100 may comprise a second hinge part 3140. At least a portion of the second hinge part 3140 may comprise a curved shape. At least a portion of the second hinge part 3140 may comprise a curved surface. The second hinge part 3140 may be connected to the first tilt part 3130. The second hinge part 3140 may be connected to the second tilt part 3150. The second hinge part 3140 may be disposed between the first tilt part 3130 and the second tilt part 3150. The second tilt part 3140 may connect the first tilt part 3130 and the second tilt part 3150. The second hinge part 3140 may comprise a plurality of second hinge parts 3140. The plurality of second hinge parts 3140 may comprise two second hinge parts 3140. One of the two second hinge parts 3140 may be formed on the second sidewall of the hinge 3100. The other of the two second hinge parts 3140 may be formed on the fourth sidewall of the hinge 3100. The hinge 3100 may be tilted with an imaginary straight line connecting the centers of the two second hinge parts 3140 as a second axis. The second tilt part 3150 may be tilted with an imaginary straight line connecting the centers of each of the two second hinge parts 3140 as a second axis. At this time, the fixing part 3110 may not be tilted.

The height of the hinge 3100 of the second hinge part 3140 from the bottom surface may be smaller than the height of the first hinge part 3120 in the corresponding direction. The height of the second fixing part 3112 of the second hinge part 3140 from the bottom surface may be smaller than the height of the first fixing part 3111 of the first hinge part 3120 from the bottom surface. At least a portion of the second hinge part 3140 may be disposed lower than the first hinge part 3120. The length between the second hinge part 3140 and the lower surface of the fixing part 3100 in the optical axis direction may be greater than the length between the first hinge part 3120 and the lower surface of the fixing part 3100 in the corresponding direction. The second hinge part 3140 of the second tilt part 3150 disposed relatively above the first tilt part 3130 may be disposed at a lower position than the first hinge part 3120 of the first tilt part 3130 placed relatively lower than the second tilt part 3150.

A length d3 of the second hinge part 3140 in a second direction may be smaller than a length d2 of the first hinge part 3120 in a second direction. Through this, the tilting movement with the second hinge part 3140 as an axis can be increased. In addition, it is possible to prevent sagging of the space between the first tilt part 3130 and the second tilt part 3150. In addition, it is possible to prevent the first tilt part 3130 or the second tilt part 3150 from being moved in an unwanted direction with the second hinge part 3140 as an axis.

The hinge 3100 may comprise a second tilt part 3150. The second tilt part 3150 may be connected to the first tilt part 3130. The second tilt part 3150 may be connected to the second hinge part 3140. The second tilt part 3130 may be connected to the first tilt part 3130 through the second hinge part 3140. The second tilt part 3130 may be disposed in the first tilt part 3130. At least a portion of the second tilt part 3130 may be spaced apart from the first tilt part 3130 in the optical axis direction. The second tilt part 3150 may be disposed at the upper portion of the hinge 3100.

The second tilt part 3150 may comprise: a second-first tilt part 3151 formed on the first sidewall of the hinge 3100; a second-second tilt part 3152 formed on the second sidewall of the hinge 3100; a second and third tilt part 3153 formed on the third sidewall of the hinge 3100; and a second-fourth tilt part 3154 formed on the fourth side wall of the hinge 3100. The second-first to second-fourth tilt parts 3151, 3152, 3153, and 3154 may be integrally formed.

The second-first tilt part 3151 may be disposed on the first-first tilt part 3151. The second-first tilt part 3151 may be spaced apart from the first-first tilt part 3151. The second-second tilt part 3152 may be disposed in the first-second tilt part 3131. The second-second tilt part 3152 may be connected to the second hinge part 3140. The lower end of the second-second tilt part 3152 may be formed inclined upward from the second hinge part 3140. The lower end of the second-second tilt part 3152 may be formed in a shape corresponding to the upper end of the first-second tilt part 3131. At least a portion of the second-second tilt part 3152 may be spaced apart from the first-second tilt part 3132. The second-third tilt part 3153 may be disposed in the first-third tilt part 3133. The second-third tilt part 3153 may be spaced apart from the first-third tilt part 3133. The second-fourth tilt part 3154 may be disposed in the first-fourth tilt part 3134. The second-fourth tilt part 3154 may be connected to the second hinge part 3140. The lower end of the second-fourth tilt part 3154 may be formed inclined upward from the second hinge part 3140. The lower end of the second-fourth tilt part 3154 may be formed in a shape corresponding to the upper end of the first-fourth tilt part 3134. At least a portion of the second-fourth tilt part 3154 may be spaced apart from the first-fourth tilt part 3134.

The second tilt part 3150 may be tilted against the first tilt part 3130 with respect to the second hinge part 3140. The second tilt part 3150 may be tilted against the first tilt part 3130 with an imaginary line connecting the two second hinge parts 3140 as a second axis.

The camera module 3010 may comprise a space formed between the fixing part 3110 of the hinge 3100 and the first tilt part 3130. A space formed between the second fixing part 3112 and the first-second tilt part 3132 may be formed in a flat shape. The first tilt part 3130 may be tilted by the space formed between the second fixing part 3112 and the first-second tilt part 3132 with the first hinge part 3120 as an axis. The space formed between the fourth fixing part 3114 and the first-fourth tilt part 3134 may be formed in a flat shape. The first tilt part 3130 may be tilted by the space formed between the fourth fixing part 3114 and the first-fourth tilt part 3134 with the first hinge part 3120 as an axis.

The space formed between the fixing part 3110 and the first tilt part 3130 of the hinge 3100 may comprise a space being extended obliquely downward from the first hinge part 3120. The space formed between the first fixing part 3111 and the first-first tilt part 3131 may be extended downwardly from the first hinge part 3120. The space formed between the third fixing part 3113 and the first-third tilt part 3133 may be formed inclined downward from the first hinge part 3120. Through this, when the first tilt part 3130 is tilted with the first hinge part 3120 as an axis, it is possible to prevent the tilting with the second hinge part 3140 as an axis. In addition, one hinge 3100 can be tilted in two axes. In addition, it is possible to secure dimensional stability and linearity than the conventional tilting method using a spring.

The camera module 3010 may comprise a space formed between the first tilt part 3130 and the second tilt part 3150 of the hinge 3100. The space formed between the first-first tilt part 3131 and the second-first tilt part 3151 may be formed in a flat shape. The second tilt part 3140 may be tilted by the space formed between the first-first tilt part 3131 and the second-first tilt part 3151 with the second hinge part 3140 as an axis. A space formed between the first-third tilt part 3133 and the second-third tilt part 3153 may be formed in a flat shape. The second tilt part 3140 may be tilted by the space formed between the first-third tilt part 3133 and the second-third tilt part 3153 with the second hinge part 3140 as an axis.

The space formed between the first tilt part 3130 and the second tilt part 3150 of the hinge 3100 may comprise a space being extended inclinedly upward from the second hinge part 3140. The space formed between the first-second tilt part 3132 and the second-second tilt part 3152 may be formed inclined upward from the second hinge part 3140. The space formed between the first-fourth tilt part 3134 and the second-fourth tilt part 3154 may be formed inclined upward from the second hinge part 3140. Through this, when the second tilt part 3140 is tilted with the second hinge part 3140 as an axis, it is possible to prevent the tilting with the first hinge part 3120 as an axis. In addition, one hinge 3100 can be tilted in two axes. In addition, it is possible to secure dimensional stability and linearity than the conventional tilting method using a spring.

The space formed between the fixing part 3110 and the first tilt part 3130 of the hinge 3100 may comprise a space formed to be inclined downward in a direction closer to the fixing part 3110 from the first hinge part 3120. In addition, the space formed between the first tilt part 3130 and the second tilt part 3150 of the hinge 3100 may comprise a space formed inclined upward in a direction away from the fixing part 3110 from the second hinge part 3140. Through this, the overall height of the hinge 3100 capable of being tilted with respect to two axes may be lowered. That is, the height of the hinge 3100 in the optical axis direction may be lowered by disposing the diagonal structures crossed. In this case, two-axis tilting is possible with one hinge 3100, while the size of the hinge 3100 in the vertical direction is minimized, and the camera module 3010 can be miniaturized. The camera module 3010 may comprise a first holder 3200. The first holder 3200 may be coupled to the fixing part 3110. The first holder 3200 may be coupled to the first fixing part 3111 of the fixing part 3110. The first holder 3200 may comprise: a first sidewall 3210; a second sidewall 3220 being extended in a vertical direction from the first sidewall 3210; a third sidewall facing the first sidewall 3210; a fourth sidewall facing the second sidewall 3220; a fifth sidewall connecting the first sidewall 3210 and the third sidewall; and a sixth sidewall connecting the second sidewall 3220 and the fourth sidewall.

The first sidewall 3210 of the first holder 3200 may be disposed at the outer side of the fixing part 3110. The first sidewall 3210 may be disposed at the outer side of the first fixing part 3111 of the fixing part 3110. At least a portion of the first sidewall 3210 may be spaced apart from the first fixing part 3111. The first sidewall 3210 may comprise a hole 3211. The hole 3211 may comprise a plurality of holes 3211. The hole 3211 may be formed at a position corresponding to the first protrusion 311-1 of the first fixing part 3111. A first protrusion 311-1 may be disposed in the hole 3211. A first protrusion 311-1 may be inserted into the hole 3211. The second sidewall 3220 of the first holder 3200 may be disposed at the outer side of the fixing part 3110. The second sidewall 3220 may be disposed at the outer side of the second fixing part 3112 of the fixing part 3110. The second sidewall 3220 may be spaced apart from the second fixing part 3112. The second sidewall 3220 may face the second fixing part 3112.

The first holder 3200 may be coupled to the first coil 3300. The first coil 3300 may be disposed in the first holder 3200. The first coil 3300 may be disposed inside the first sidewall 3210, the third sidewall, and the fifth sidewall of the first holder 3200. The first holder 3200 may be coupled to the second coil 3400. The second coil 3400 may be disposed inside the first holder 3200. The second coil 3400 may be disposed inside the second sidewall 3220, the fourth sidewall, and the sixth sidewall of the first holder 3200.

The camera module 3010 may comprise a first coil 3300. A hinge 3100 of the first coil 3300 may be coupled to the fixing part 3110. The first coil 3300 may be coupled to the first fixing part 3111. The first coil 3300 may be coupled to the first fixing part 3111 through the first holder 3200. The first coil 3300 may be disposed inside the first holder 3200. The first coil 3300 may be coupled to the first holder 3200. The first coil 3300 may be spaced apart from the second coil 3400. The first coil 3300 may be spaced apart from each other in a direction perpendicular to the direction in which the second coil 3400 is disposed. The first coil 3300 may face the first magnet 3600.

The camera module 3010 may comprise a second coil 3400. The second coil 3400 may be coupled to the fixing part 3110 of the hinge 3100. The second coil 3400 may be coupled to the second fixing part 3112. The second coil 3400 may be coupled to the second fixing part 3112 through the first holder 3200. The second coil 3400 may be disposed inside the first holder 3200. The second coil 3400 may be coupled to the first holder 3200. The second coil 3400 may be spaced apart from the first coil 3300. The second coil 3400 may be spaced apart from each other in a direction perpendicular to the direction in which the first coil 3300 is disposed. The second coil 3400 may face the second magnet 3800.

The camera module 3010 may comprise a second holder 3500. The second holder 3500 may be coupled to the second tilt part 3150. The second holder 3500 may be spaced apart from the third holder 3700. The second holder 3500 may be disposed in a direction perpendicular to the third holder 3700. A first magnet 3600 may be coupled to the second holder 3500. The second holder 3500 may be a magnet holder. The second holder 3500 may comprise: a first portion 3510 coupled to the upper surface of the hinge 3100; a second portion 3520 being extended from the first portion 3510 and disposed on the outer side surface of the second tilt part 3150; and a third portion 3530 being extended from the second portion 3520 and spaced apart from the outer side surface of the second tilt part 3150. A first magnet 3600 may be coupled to the third portion 3530 of the second holder 3500.

The second holder 3500 may comprise a first groove recessed from the inner side surface and a second groove recessed inward from the second groove. The first groove may be formed by the first portion 3510 and the second portion 3520. The second groove may be formed by the second portion 3520 and the third portion 3530. At least a portion of the first groove may be coupled to the second tilt part 3150. The first groove may be coupled to the second-first tilt part 3151. The second holder 3500 may comprise a hole 3511. The hole 3511 may be formed in the first portion 3510 of the second holder 3500. The hole 3511 may be formed at a position corresponding to a protrusion 3921 of the flange 3920. The protrusion 3921 of the flange 3920 may be inserted into the hole 3511.

The camera module 3010 may comprise a first magnet 3600. The first magnet 3600 may be coupled to any one or more of the first tilt part 3130, the second tilt part 3150, and the lens driving device 3020. The first magnet 3600 may face the first coil 3300. The first magnet 3600 may be coupled to the second holder 3500. The first magnet 3600 may be coupled to the hinge 3100 through the second holder 3500. The first magnet 3600 may be coupled to the third portion 3530 of the second holder 3500. The first magnet 3600 may be coupled to the first-first tilt part 3131. The first magnet 3600 may be coupled to the second-first tilt part 3151. At least a portion of the first magnet 3600 may be overlapped with the first-first tilt part 3131 in a direction perpendicular to the optical axis. At least a portion of the first magnet 3600 may be overlapped with the first-first tilt part 3131 in a second direction perpendicular to the optical axis. At least a portion of the first magnet 3600 may be overlapped with the second-first tilt part 3151 in a direction perpendicular to the optical axis. At least a portion of the first magnet 3600 may be overlapped with the second-first tilt part 3151 in a second direction perpendicular to the optical axis. The first magnet 3600 may be spaced apart from the second magnet 3800. The first magnet 3600 may be disposed in a direction perpendicular to the direction in which the second magnet 3800 is disposed.

The camera module 3010 may comprise a third holder 3700. The third holder 3700 may be coupled to the second tilt part 3150. The third holder 3700 may be spaced apart from the second holder 3500. The third holder 3700 may be disposed in a direction perpendicular to the second holder 3500. A second magnet 3800 may be coupled to the third holder 3700. The third holder 3700 may be a magnet holder. The third holder 3700 may comprise: a first portion 3710 coupled to the upper surface of the hinge 3100; a second portion 3720 being extended from the first portion 3710 and disposed on the outer side surface of the second tilt part 3150; and a third portion 3730 being extended from the second portion 3720 and spaced apart from the outer side surface of the second tilt part 3150. A second magnet 3800 may be coupled to the third portion 3730 of the third holder 3700.

The third holder 3700 may comprise a first groove recessed from the inner side surface and a second groove recessed inward from the second groove. The first groove of the third holder 3700 may be formed by the first portion 3710 and the second portion 3720. The second groove of the third holder 3700 may be formed by the second portion 3720 and the third portion 3730. At least a portion of the first groove of the third holder 3700 may be coupled to the second tilt part 3150. The first groove of the third holder 3700 may be coupled to the second-second tilt part 3152. The third holder 3700 may comprise a hole 3711. The hole 3711 may be formed in the first portion 3710 of the third holder 3700. The hole 3711 may be formed at a position corresponding to the protrusion 3921 of the flange 3920. The protrusion 3921 of the flange 3920 may be inserted into the hole 3711.

The camera module 3010 may comprise a second magnet 3800. The second magnet 3800 may be coupled to any one or more of the first tilt part 3130, the second tilt part 3150, and the lens driving device 3020. The second magnet 3800 may face the second coil 3400.

The second magnet 3800 may be coupled to the third holder 3700. The second magnet 3800 may be coupled to the hinge 3100 through the third holder 3700. The second magnet 3800 may be coupled to the third portion 3730 of the third holder 3700. The second magnet 3800 may be coupled to the first-second tilt part 3132. The second magnet 3800 may be coupled to the second-second tilt part 3152. At least a portion of the second magnet 3800 may be overlapped with the first-second tilt part 3132 in a direction perpendicular to the optical axis. At least a portion of the second magnet 3800 may be overlapped with the first-second tilt part 3132 in a first direction perpendicular to the optical axis. At least a portion of the second magnet 3800 may be overlapped with the second-second tilt part 3152 in a direction perpendicular to the optical axis. At least a portion of the second magnet 3800 may be overlapped with the second-second tilt part 3152 in a first direction perpendicular to the optical axis. The second magnet 3800 may be spaced apart from the first magnet 3600. The second magnet 3800 may be disposed in a direction perpendicular to the direction in which the first magnet 3600 is disposed.

The camera module 3010 may comprise a fourth holder 3900. At least a portion of the fourth holder 3900 may be disposed inside the hinge 3100. The fourth holder 3900 may be disposed on the first to fourth sidewalls of the hinge 3100. The fourth holder 3900 may be coupled to the second tilt part 3150. The fourth holder 3900 may comprise a carrier 3910. The carrier 3910 may be disposed inside the hinge 3100. A lens driving device 3020 may be disposed in the carrier 3910. The fourth holder 3900 may comprise a flange 3920. The flange 3920 may be formed in the upper portion of the carrier 3910. The flange 3920 may be disposed between the upper surface of the hinge 3100 and the first portion 3510 of the second holder 3500. The flange 3920 may comprise a protrusion 3921. The protrusion 3921 may be protruded from the upper surface of the flange 3920. The protrusion 3921 may be coupled to the hole 3511 of the first portion 3510 of the second holder 3500. The protrusion 3921 may be inserted into the hole 3511 of the first portion 3510 of the second holder 3500.

The camera module 3010 may comprise a lens driving device 3020. The lens driving device 3020 may be coupled to the second tilt part 3150. The lens driving device 3020 may be disposed inside the fourth holder 3900. The lens driving device 3020 may comprise: a substrate (not shown); an image sensor (not shown) disposed in the substrate; a holder (not shown) disposed above the substrate; and a lens (not shown) coupled to the holder and disposed at a position corresponding to the image sensor. The lens driving device 3020 may be a voice coil motor (VCM). The lens driving device 3020 may be a lens driving motor. The lens driving device 3020 may be a lens driving motor. The lens driving device 3020 may be a lens driving actuator. The lens driving device 3020 according to a second embodiment of the present invention may perform an auto focus (AF) function. The lens driving device 3020 may perform an optical image stabilizer (OIS) function.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A driving device comprising:
a second guide part;
a first guide part disposed on the second guide part;
an optical unit disposed on the first guide part;
a first driving part disposed on the optical unit; and
a second driving part facing the first driving part;

third and fourth driving parts disposed on the second guide parts; and a lens unit coupled to the second guide part, wherein the first guide part comprises a first fixing part coupled to the second guide part, a first moving part connected to the optical unit, and a first connection part connecting the first fixing part and the first moving part, wherein the optical unit is tilted about the first connection part by an interaction between the first driving part and the second driving part, wherein the second guide part comprises a second moving part coupled with the first fixing part, a second fixing part coupled with the lens unit, and a second connection part connecting the second moving part and the second fixing part, wherein the optical unit is tilted about the second connection part by an interaction between the third driving part and the fourth driving part.

2. The driving device of claim 1, wherein the first moving part and the first fixing part are hinge-coupled by the first connection part.

3. The driving device of claim 1, wherein the second fixing part and the second moving part are disposed vertically, and wherein a gap is formed between the second fixing part and the second moving part.

4. The driving device of claim 1, comprising a substrate disposed on the second guide part, wherein the substrate comprises a first region disposed with the second driving part, a second region disposed with the third driving part, and a third region connecting the first region and the second region, and wherein the third region is bent from the first region.

5. The driving device of claim 1, wherein the optical unit comprises a prism, and wherein the prism is configured to move with respect to the lens unit.

6. The driving device of claim 1, wherein the first driving part comprises a magnet, wherein the second driving part comprises a coil, wherein the third driving part comprises a coil, and wherein the fourth driving part comprises a magnet.

7. The driving device of claim 1, wherein the second moving part comprises a hole or a groove, and wherein the first fixing part comprises a protrusion coupled to the hole or the groove of the second moving part.

8. The driving device of claim 1, wherein the first fixing part comprises three side walls, wherein the first moving part comprises three side walls, and wherein the first connection part connects two of the three side walls of the first fixing part and two of the three side walls of the first moving part, respectively.

9. The driving device of claim 8, wherein the second fixing part comprises three side walls, wherein the second moving part comprises three side walls, and wherein the second connection part connects one of the three side walls of the second fixing part and one of the three side walls of the second moving part.

10. The driving device of claim 9, wherein inner surfaces of the three side walls of the second fixing part face outer surfaces of the three side walls of the first moving part, respectively, and wherein inner surfaces of the three side walls of the second moving part face outer surfaces of the three side walls of the first fixing part, respectively.

11. The driving device of claim 8, wherein the three side walls of the first fixing part comprise a first side wall and a second side wall facing each other, and a third side wall connecting the first side wall and the second side wall, wherein the three side walls of the first moving part comprise a first side wall and a second side wall facing each other, and a third side wall connecting the first side wall of the first moving part and the second side wall of the first moving part, and wherein the first connection part comprises a first part connecting the first side wall of the first fixing part and the first side wall of the first moving part, and a second part connecting the second side wall of the first fixing part and the second side wall of the first moving part.

12. The driving device of claim 9, wherein the three side walls of the second fixing part comprise a first side wall and a second side wall facing each other, and a third side wall connecting the first side wall and the second side wall, wherein the three side walls of the second moving part comprise a first side wall and a second side wall facing each other, and a third side wall connecting the first side wall of the second moving part and the second side wall of the second moving part, and wherein the second connection part connects the third side wall of the second fixing part and the third side wall of the second moving part.

13. The driving device of claim 9, wherein the third driving part is disposed on at least one of the three side walls of the second moving part, wherein the fourth driving part is disposed on at least one of the three side walls of the second fixing part, and wherein a side wall disposed with the third driving part and a side wall disposed with the fourth driving part are disposed to correspond to each other.

14. A driving device comprising:

a second guide part;

a first guide part disposed on the second guide part;

an optical unit disposed on the first guide part;

third and fourth driving parts disposed on the second guide part;

a lens unit coupled to the second guide part;

a substrate disposed on the second guide part;

a first coil and a first magnet configured to move the optical unit in a first direction by an interaction; and a second coil and a second magnet configured to move the optical unit in a second direction different from the first direction by an interaction, wherein the first guide part comprises a first fixing part coupled to the second guide part, a first moving part connected to the optical unit, and a first connection part connecting the first fixing part and the first moving part, and wherein the second guide part comprises a second fixing part, a second moving part coupled with the first fixing part, and a second connection part connecting the second fixing part and the second moving part, wherein the substrate comprises a first region disposed with the second driving part, a second region disposed with the third driving part, and a third region connecting the first region and the second region, and wherein the third region is bent from the first region.

15. The driving device of claim 14, wherein the first moving part is tilted with respect to the first fixing part about the first connection part, and wherein the second moving part is tilted with respect to the second fixing part about the second connection part.

16. The driving device of claim 14, wherein the first fixing part comprise a first side wall and a second side wall facing each other, and a third side wall connecting the first side wall and the second side wall,
- wherein the first moving part comprise a first side wall and a second side wall facing each other, and a third side wall connecting the first side wall of the first moving part and the second side wall of the first moving part, and
- wherein the first connection part comprises a first part connecting the first side wall of the first fixing part and the first side wall of the first moving part, and a second part connecting the second side wall of the first fixing part and the second side wall of the first moving part.

17. The driving device of claim 14, wherein the second fixing part comprise a first side wall and a second side wall facing each other, and a third side wall connecting the first side wall and the second side wall,
- wherein the second moving part comprise a first side wall and a second side wall facing each other, and a third side wall connecting the first side wall of the second moving part and the second side wall of the second moving part, and
- wherein the second connection part connects the third side wall of the second fixing part and the third side wall of the second moving part.

18. A camera module comprising:
- a second guide part;
- a first guide part disposed on the second guide part;
- an optical unit disposed on the first guide part;
- a first driving part disposed on the optical unit;
- a second driving part facing the first driving part;
- third and fourth driving parts disposed on the second guide part; and
- a lens unit coupled to the second guide part,
- wherein the first guide part comprises a first fixing part coupled to the second guide part, a first moving part connected to the optical unit, and a first connection part connecting the first fixing part and the first moving part,
- wherein the second guide part comprises a second moving part coupled with the first fixing part, a second fixing part coupled with the lens unit, and a second connection part connecting the second moving part and the second fixing part,
- wherein the optical unit is tilted by an interaction between the first driving part and the second driving part about the first connection part,
- wherein the optical unit comprises a prism, and
- wherein the prism is configured to move with respect to the lens unit.

* * * * *